(12) United States Patent
Abaya et al.

(10) Patent No.: US 10,671,669 B2
(45) Date of Patent: Jun. 2, 2020

(54) SUB-GRAPH INTERFACE GENERATION

(71) Applicant: Ab Initio Technology LLC, Lexington, MA (US)

(72) Inventors: Victor T. Abaya, Bedford, MA (US); Russell L. Bryan, Bedford, MA (US); Brond Larson, Sharon, MA (US); Carl Offner, Sudbury, MA (US); Daniel J. Teven, Sharon, MA (US)

(73) Assignee: Ab Initio Technology LLC, Lexington, MA (US)

( * ) Notice: Subject to any disclaimer, the term of this patent is extended or adjusted under 35 U.S.C. 154(b) by 569 days.

(21) Appl. No.: 15/384,508

(22) Filed: Dec. 20, 2016

(65) Prior Publication Data
US 2017/0177740 A1    Jun. 22, 2017

Related U.S. Application Data

(60) Provisional application No. 62/270,163, filed on Dec. 21, 2015.

(51) Int. Cl.
*G06F 16/901* (2019.01)
*G06F 3/0481* (2013.01)
(Continued)

(52) U.S. Cl.
CPC ........ *G06F 16/9024* (2019.01); *G06F 3/0481* (2013.01); *G06F 3/04847* (2013.01);
(Continued)

(58) Field of Classification Search
USPC ........................................................ 707/798
See application file for complete search history.

(56) References Cited

U.S. PATENT DOCUMENTS 3,662,343 A    5/1972  Goldstein et al.
3,662,401 A    5/1972  Collins et al.
(Continued)

FOREIGN PATENT DOCUMENTS

AU    2014262225    12/2014
CN    103069385    4/2013
(Continued)

OTHER PUBLICATIONS

U.S. Appl. No. 09/627,252 U.S. Pat. No. 7,164,422, filed Jul. 28, 2000 Jan. 16, 2007, Parameterized Graphs With Conditional Components.
(Continued)

*Primary Examiner* — Cam Linh T Nguyen
(74) *Attorney, Agent, or Firm* — Occhiuti & Rohlicek LLP

(57) ABSTRACT

A specification including a description of a first directed graph including a first plurality of components interconnected by a first set of one or more directed links is received. A graph interface is formed for the first plurality of components including: forming a first interface element of the graph interface, the first interface element being associated with a first port of a first component of the first number of components, and configuring one or more properties of the first interface element such that the first port of the first component is consistent with the one or more properties of the first interface element. A first implementation of the graph interface is formed including the first number of components, the forming including forming a first correspondence between the first interface element and the first port of the first component of the first number of components.

33 Claims, 18 Drawing Sheets

(51) Int. Cl.
 *G06F 3/0484*  (2013.01)
 *G06F 16/22*  (2019.01)
 *G06F 16/21*  (2019.01)
 *G06F 8/34*  (2018.01)

(52) U.S. Cl.
 CPC .............. *G06F 8/34* (2013.01); *G06F 16/211* (2019.01); *G06F 16/22* (2019.01)

(56) References Cited

U.S. PATENT DOCUMENTS

| | | |
|---|---|---|
| 4,228,496 A | 10/1980 | Katzman et al. |
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Neches |
| 5,280,619 A | 1/1994 | Wang |
| 5,301,336 A | 4/1994 | Kodosky |
| 5,323,452 A | 6/1994 | Dickman et al. |
| 5,333,319 A | 7/1994 | Silen |
| 5,357,632 A | 10/1994 | Pian et al. |
| 5,418,888 A | 5/1995 | Alden |
| 5,432,942 A | 7/1995 | Trainer |
| 5,495,590 A | 2/1996 | Comfort et al. |
| 5,504,900 A | 4/1996 | Raz |
| 5,630,047 A | 5/1997 | Wang |
| 5,692,168 A | 11/1997 | McMahan |
| 5,701,400 A | 12/1997 | Amardo |
| 5,712,971 A | 1/1998 | Stanfill et al. |
| 5,745,778 A | 4/1998 | Alfieri |
| 5,799,266 A | 8/1998 | Hayes |
| 5,802,267 A | 9/1998 | Shirakihara et al. |
| 5,805,462 A | 9/1998 | Poirot et al. |
| 5,857,204 A | 1/1999 | Lordi et al. |
| 5,890,997 A | 4/1999 | Roth |
| 5,923,832 A | 7/1999 | Shirakihara et al. |
| 5,924,095 A | 7/1999 | White |
| 5,930,794 A | 7/1999 | Linenbach et al. |
| 5,933,640 A | 8/1999 | Dion |
| 5,966,072 A | 10/1999 | Stanfill et al. |
| 5,999,729 A | 12/1999 | Tabloski, Jr. et al. |
| 6,006,242 A | 12/1999 | Poole et al. |
| 6,012,094 A | 1/2000 | Leyman |
| 6,014,670 A | 1/2000 | Zamanian et al. |
| 6,016,516 A | 1/2000 | Horikiri |
| 6,032,158 A | 2/2000 | Mukhopadhyay et al. |
| 6,038,558 A | 3/2000 | Powers et al. |
| 6,044,211 A | 3/2000 | Jain |
| 6,044,374 A | 3/2000 | Nesamoney et al. |
| 6,044,394 A | 3/2000 | Cadden et al. |
| 6,088,716 A | 7/2000 | Stanfill et al. |
| 6,145,017 A | 11/2000 | Ghaffari |
| 6,173,276 B1 | 1/2001 | Kant et al. |
| 6,208,345 B1 | 3/2001 | Sheard et al. |
| 6,256,637 B1 | 7/2001 | Venkatesh et al. |
| 6,259,988 B1 | 7/2001 | Galkowski et al. |
| 6,272,650 B1 | 8/2001 | Meyer et al. |
| 6,301,601 B1 | 10/2001 | Hellard |
| 6,314,114 B1 | 11/2001 | Coyle et al. |
| 6,324,437 B1 | 11/2001 | Frankel et al. |
| 6,330,008 B1 | 12/2001 | Razdow et al. |
| 6,332,212 B1 | 12/2001 | Organ et al. |
| 6,339,775 B1 | 1/2002 | Zamanian et al. |
| 6,400,996 B1 | 6/2002 | Hoffberg et al. |
| 6,401,216 B1 | 6/2002 | Meth et al. |
| 6,437,796 B2 | 8/2002 | Sowizral et al. |
| 6,449,711 B1 | 9/2002 | Week |
| 6,480,876 B2 | 11/2002 | Rehg et al. |
| 6,496,961 B2 | 12/2002 | Gupta et al. |
| 6,538,651 B1 | 3/2003 | Hayman et al. |
| 6,584,581 B1 | 6/2003 | Stanfill et al. |
| 6,608,628 B1 | 8/2003 | Ross et al. |
| 6,611,862 B2 | 8/2003 | Reisman |
| 6,651,234 B2 | 11/2003 | Gupta et al. |
| 6,654,907 B2 | 11/2003 | Stanfill et al. |
| 6,658,464 B2 | 12/2003 | Reisman |
| 6,715,145 B1 | 3/2004 | Bowman-Amuah |
| 6,728,879 B1 | 4/2004 | Atkinson |
| 6,760,903 B1 | 7/2004 | Morshed et al. |
| 6,813,761 B1 | 11/2004 | Das et al. |
| 6,816,825 B1 | 11/2004 | Ashar et al. |
| 6,832,369 B1 | 12/2004 | Kryka et al. |
| 6,848,100 B1 | 1/2005 | Wu et al. |
| 6,879,946 B2 | 4/2005 | Rong et al. |
| 6,951,013 B1 | 9/2005 | Lozins |
| 7,062,483 B2 | 6/2006 | Ferrari et al. |
| 7,082,604 B2 | 7/2006 | Schneiderman |
| 7,085,426 B2 | 8/2006 | August |
| 7,103,597 B2 | 9/2006 | McGovern |
| 7,103,620 B2 | 9/2006 | Kunz et al. |
| 7,130,484 B2 | 10/2006 | August |
| 7,137,116 B2 | 11/2006 | Parkes et al. |
| 7,164,422 B1 * | 1/2007 | Wholey, III .......... G06F 9/4494 345/440.1 |
| 7,165,030 B2 | 1/2007 | Yi et al. |
| 7,167,850 B2 | 1/2007 | Stanfill |
| 7,287,246 B2 | 10/2007 | Tan et al. |
| 7,292,537 B2 | 11/2007 | Charcranoon |
| 7,316,001 B2 | 1/2008 | Gold et al. |
| 7,356,819 B1 | 4/2008 | Ricart et al. |
| 7,398,514 B2 | 7/2008 | Ulrich et al. |
| 7,412,658 B2 | 8/2008 | Gilboa |
| 7,417,645 B2 | 8/2008 | Beda et al. |
| 7,457,984 B2 | 11/2008 | Kutan |
| 7,467,383 B2 | 12/2008 | Inchingolo et al. |
| 7,505,975 B2 | 3/2009 | Luo |
| 7,577,628 B2 | 8/2009 | Stanfill |
| 7,594,220 B2 | 9/2009 | Kodosky et al. |
| 7,636,699 B2 | 12/2009 | Stanfill |
| 7,716,630 B2 | 5/2010 | Wholey et al. |
| 7,840,949 B2 | 11/2010 | Schumacher et al. |
| 7,870,556 B2 | 1/2011 | Wholey et al. |
| 7,877,350 B2 | 1/2011 | Stanfill et al. |
| 8,281,297 B2 | 10/2012 | Dasu |
| 8,396,886 B1 | 3/2013 | Tsimelzon et al. |
| 8,429,631 B2 | 4/2013 | Schumacher et al. |
| 8,566,641 B2 | 10/2013 | Douros et al. |
| 8,997,040 B2 | 3/2015 | Zinkovsky et al. |
| 9,165,029 B2 | 10/2015 | Bhoovaraghavan et al. |
| 9,323,650 B2 | 4/2016 | Pasala et al. |
| 9,886,241 B2 * | 2/2018 | Stevens ................... G06F 8/34 |
| 9,977,659 B2 | 5/2018 | Larson et al. |
| 2001/0055019 A1 | 12/2001 | Sowizral et al. |
| 2002/0080181 A1 | 6/2002 | Razdow et al. |
| 2002/0087921 A1 | 7/2002 | Rodriguez |
| 2002/0091747 A1 | 7/2002 | Rehg et al. |
| 2002/0091748 A1 | 7/2002 | Rehg et al. |
| 2002/0111876 A1 | 8/2002 | Rudraraju et al. |
| 2002/0129340 A1 | 9/2002 | Tuttle |
| 2002/0147745 A1 | 10/2002 | Houben et al. |
| 2002/0184616 A1 | 12/2002 | Chessell et al. |
| 2003/0004771 A1 | 1/2003 | Yaung |
| 2003/0016246 A1 | 1/2003 | Singh |
| 2003/0023413 A1 | 1/2003 | Srinivasa |
| 2003/0033432 A1 | 2/2003 | Simpson et al. |
| 2003/0091055 A1 | 5/2003 | Craddock et al. |
| 2003/0126240 A1 | 7/2003 | Vosseler |
| 2003/0130821 A1 * | 7/2003 | Anslow ................... H04L 41/12 702/186 |
| 2003/0204804 A1 | 10/2003 | Petri et al. |
| 2004/0006745 A1 | 1/2004 | Van Heldan et al. |
| 2004/0024573 A1 * | 2/2004 | Allen ..................... H04L 41/12 702/189 |
| 2004/0041838 A1 | 3/2004 | Adusumilli et al. |
| 2004/0073529 A1 | 4/2004 | Stanfill |
| 2004/0093559 A1 | 5/2004 | Amaru et al. |
| 2004/0098452 A1 | 5/2004 | Brown et al. |
| 2004/0107414 A1 | 6/2004 | Bronicki et al. |
| 2004/0111469 A1 | 6/2004 | Manion et al. |
| 2004/0148373 A1 | 7/2004 | Childress et al. |
| 2004/0177099 A1 | 9/2004 | Ganesh et al. |
| 2004/0205726 A1 | 10/2004 | Chedgey et al. |
| 2004/0207665 A1 | 10/2004 | Mathur |
| 2004/0210831 A1 | 10/2004 | Feng et al. |

(56) References Cited

U.S. PATENT DOCUMENTS

| | | |
|---|---|---|
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0033720 A1 | 2/2005 | Verma et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097515 A1 | 5/2005 | Ribling |
| 2005/0097561 A1 | 5/2005 | Schumacher et al. |
| 2005/0102670 A1 | 5/2005 | Bretl et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturianu et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0085462 A1 | 4/2006 | Todd |
| 2006/0095722 A1 | 5/2006 | Biles et al. |
| 2006/0098017 A1 | 5/2006 | Tarditi et al. |
| 2006/0130041 A1 | 6/2006 | Pramanick et al. |
| 2006/0190105 A1 | 8/2006 | Hsu et al. |
| 2006/0206872 A1 | 9/2006 | Krishnaswamy |
| 2006/0282474 A1 | 12/2006 | MacKinnon |
| 2006/0294015 A1 | 12/2006 | Stanfill et al. |
| 2006/0294150 A1* | 12/2006 | Stanfill ............... G06F 8/51 |
| 2006/0294459 A1 | 12/2006 | Davis et al. |
| 2007/0011668 A1* | 1/2007 | Wholey ............... G06F 8/34 717/151 |
| 2007/0022077 A1 | 1/2007 | Stanfill |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGoveran |
| 2007/0179923 A1 | 8/2007 | Stanfill |
| 2007/0198971 A1 | 8/2007 | Dasu et al. |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0288856 A1 | 11/2008 | Goranson |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansal et al. |
| 2009/0235267 A1 | 9/2009 | McKinney et al. |
| 2009/0245426 A1 | 10/2009 | Ratnakar et al. |
| 2009/0313625 A1 | 12/2009 | Sharoff |
| 2009/0327196 A1 | 12/2009 | Studer et al. |
| 2010/0042976 A1 | 2/2010 | Hines |
| 2010/0070955 A1 | 3/2010 | Kahlon |
| 2010/0079460 A1* | 4/2010 | Breeds ............... G06T 11/206 345/440 |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281462 A1 | 11/2010 | Festa |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0179014 A1 | 7/2011 | Schechter et al. |
| 2011/0307897 A1 | 12/2011 | Atterbury et al. |
| 2012/0023508 A1 | 1/2012 | Flores et al. |
| 2012/0036498 A1 | 2/2012 | Akirekadu et al. |
| 2012/0054255 A1 | 3/2012 | Buxbaum |
| 2012/0102029 A1 | 4/2012 | Larson et al. |
| 2012/0151419 A1 | 6/2012 | Kent et al. |
| 2012/0216176 A1 | 8/2012 | Gaikwad et al. |
| 2012/0222017 A1 | 8/2012 | Hinkle et al. |
| 2012/0233599 A1 | 9/2012 | Valdiviezo et al. |
| 2012/0284255 A1 | 11/2012 | Schechter et al. |
| 2013/0124392 A1 | 5/2013 | Achanta et al. |
| 2013/0167241 A1 | 6/2013 | Siman |
| 2013/0239089 A1 | 9/2013 | Eksten et al. |
| 2013/0290928 A1 | 10/2013 | Johnson |
| 2014/0068566 A1 | 3/2014 | Coronado et al. |
| 2014/0143760 A1 | 5/2014 | Buxbaum et al. |
| 2014/0229846 A1* | 8/2014 | Abaya ............... G06F 3/0481 715/744 |
| 2015/0160926 A1 | 6/2015 | Larson et al. |
| 2015/0160927 A1* | 6/2015 | Stevens ............... G06F 8/34 717/105 |
| 2016/0261466 A1* | 9/2016 | Daniel ............... G06F 8/10 |

FOREIGN PATENT DOCUMENTS

| | | |
|---|---|---|
| EP | 0834810 | 4/1998 |
| JP | 64-013189 | 1/1989 |
| JP | H01094431 | 4/1989 |
| JP | 06-236276 | 8/1994 |
| JP | H08106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000089955 | 3/2000 |
| JP | 2000-99317 | 4/2000 |
| JP | 2006-504160 | 2/2006 |
| JP | 2006268409 | 10/2006 |
| WO | 98/00791 | 1/1998 |
| WO | 2002/011344 | 2/2002 |
| WO | 2005/001687 | 1/2005 |
| WO | 2005/086906 | 9/2005 |
| WO | 2008/124319 | 10/2008 |
| WO | 2009/039352 | 3/2009 |
| WO | 2014/011708 | 1/2014 |

OTHER PUBLICATIONS

U.S. Appl. No. 10/268,509 U.S. Pat. No. 7,167,850, filed Oct. 10, 2002 Jan. 23, 2007, Startup and Control of Graph-Based Computation.

U.S. Appl. No. 11/467,724 U.S. Pat. No. 7,577,628, filed Aug. 28, 2006 Aug. 18, 2009, Startup and Control of Graph-Based Computation.

U.S. Appl. No. 11/733,579 U.S. Pat. No. 7,636,699, filed Apr. 10, 2007 Dec. 22, 2009, Processing Transactions Using Graph-Based Computations Including Instances of Computation Graphs Associated With the Transactions.

U.S. Appl. No. 11/169,014 U.S. Pat. No. 7,716,630, filed Jun. 27, 2005 May 11, 2010, Managing Parameters for Graph-Based Computations.

U.S. Appl. No. 11/167,902 U.S. Pat. No. 7,877,350, filed Jun. 27, 2005 Jan. 25, 2011, Managing Metadata for Graph-Based Computations.

U.S. Appl. No. 12/977,545 U.S. Pat. No. 8,484,159, filed Dec. 23, 2010 Jul. 9, 2013, Managing Metadata for Graph-Based Computations.

U.S. Appl. No. 11/836,349, filed Aug. 9, 2007, Distributing Services in Graph-Based Computations.

(56) References Cited

OTHER PUBLICATIONS

U.S. Appl. No. 12/180,141, filed Jul. 25, 2008, Transactional Graph-Based Computation With Error Handling.
U.S. Appl. No. 12/704,998, filed Feb. 12, 2010, Managing Task Execution.
U.S. Appl. No. 13/161,010, filed Jun. 15, 2011, Dynamically Loading Graph-Based Computations.
U.S. Appl. No. 12/638,588, filed Dec. 15, 2009, Processing Transactions in Graph-Based Applications.
U.S. Appl. No. 13/678,921, filed Nov. 16, 2012, Dynamic Graph Performance Monitoring.
U.S. Appl. No. 13/678,928, filed Nov. 16, 2012, Dynamic Component Performance Monitoring.
U.S. Appl. No. 13/733,403, filed Jan. 3, 2013, Configurable Testing of Computer Programs.
U.S. Appl. No. 14/165,698, filed Jan. 28, 2014, Configurable Testing of Computer Programs.
U.S. Appl. No. 14/561,435, filed Dec. 5, 2014, Managing Interfaces for Sub-Graphs.
U.S. Appl. No. 14/561,494, filed Dec. 5, 2014, Managing Interfaces for Sub-Graphs.
Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.
Baer, J.L. et al., "Legality and Other Properties of Graph Models of Computations." Journal of the Association for Computing Machinery, vol. 17, No. 3, Jul. 1970, pp. 543-554.
Bernstein and Newcomer, "Principles of Transaction Processing, 2nd Edition", Morgan Kaufmann, XP002739946 (Jul. 24, 2009).
Bookstein, A. et al., "Modeling Word Occurrences for the Compression of Concordances." ACM Transactions on Information Systems, vol. 15, No. 3, Jul. 1997, pp. 254-290.
Burch, J.R. et al., "Sequential circuit verification using symbolic model checking." In Design Automation Conference, 1990, Proceedings of the 27th ACM/IEEE. Jun. 24-28, 1990, pp. 46-51.
Control-M; New Dimension Software. User Manual. New Dimension Software Ltd., 1999.
Cytron, Ron et al., "Efficiently Computing Static Single Assignment Form and the Control Dependence Graph." ACM Transactions on Programming Languages and Systems, vol. 13, No. 4, Oct. 1991, pp. 451-490.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Ebert, Jurgen et al., "A Declarative Approach to Graph-Based Modeling." Workshop on Graph-Theoretic Concepts in Computer Science, 1994, pp. 1-19.
Evripidou, Pamskevas, et al., "Incorporating input/output operations into dynamic data-flow graphs," Parallel Computing 21 (1995) 1285-1311.
Frankl, Phyllis G., et al., "An Applicable Family of Data Flow Testing Criteria," IEEE Transactions on Sofrware Engineering, vol. 14, No. 10, Oct. 1988, pp. 1483-1498.
Gamma et al. "Design Patterns: Elements of Reusable Object-Oriented Software", Sep. 1999.
Guyer et al., "Finding Your Cronies: Static Analysis for Dynamic Object Colocation." Oct. 2004, ACM, pp. 237-250.
Grove et al., "A Framework for Call Graph Construction Algorithms." Nov. 2001, ACM TOPLAS, vol. 23, Issue 6, pp. 685-746.
Herniter, Marc E., "Schematic Capture with MicroSim PSpice," 2nd Edition, Prentice Hall, Upper Saddle River, N.J., 1996, pp. 51-52, 255-280, 292-297.
IBM: "Concepts and Architecture—Version 3.6," Internet citation, http://publibfp.boulder.ibm.com.epubs/pdf/h1262857, retrieved Apr. 19, 2007.
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Karasawa, K.; Iwata, M.; and Terada, H.—"Direct generation of data-driven program for stream oriented processing"—Published in: Parallel Architectures and Compilation Techniques., 1997. Proceedings., 1997 International Conference on; Nov. 10-14, 1997 San Francisco, CA—pp. 295-306.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Mattson et al., "Patterns for Parallel Programming," Addison-Wesley Professional ISBN: 0-321-22811-1 (2004).
"Modular programming" Wikipedia, retrieved Feb. 10, 2009 (2 pages).
National Instruments LABVIEW User Manual, Apr. 2003 Edition National Instruments Corporation, Austin TX (349 pages).
Ou, Chao-Wei et al., "Architecture-Independent Locality-Improving Transformations of Computational Graphs Embedded in k-Dimensions." Proceedings of the 9th International Conference on Supercomputing, 1995, pp. 289-298.
Rajesh K. Gupta and Giovanni de Micheli—"A co-synthesis approach to embedded system design automation" Design Automation for Embedded Systems, vol. 1, issue 1-2,69-120.
"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.
Romberg, M., "UNICORE: Beyond Web-based Job-Submission," Proceedings of the 42nd Cray User Group Conference, Noordwijk (May 22-26, 2000).
Russell, Nick, et al., "Workflow Control-Flow Patterns a Revised View," Workflow Patterns Initiative, 2006, pp. 1-134.
Shoten, Iwanami, "Encyclopedic Dictionary of Computer Science," (with English Translation), May 25, 1990, p. 741.
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig et al., "Parallel Free-Text Search on the Connection Machine System." Communications of the ACM, vol. 29, No. 12, Dec. 1986, pp. 1229-1239.
Stanfill, Craig, "The Marriage of Parallel Computing and Information Retrieval." IEE Colloquium on Parallel Techniques for Information Retrieval, Apr. 1989, 5 pages.
"System integration" Wikipedia, retrieved Jan. 25, 2009 (3 pages).
"Topological sorting," Wikipedia, accessed Dec. 10, 2012, 2 pages.
"Unicenter AutoSys Job Management," Computer Associates, Copyright 2001.
Vajracharya, Suvas et al., "Asynchronous Resource Management." Proceedings of the 15th International Parallel and Distributed Processing Symposium, Apr. 2001, 10 pages.
van der Aalst, W.M.P., et al., "Workflow Patterns," Distributed and Parallel Databases, 14, 5-51, 2003.
"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).
Wah, B.W. et al., "Report on Workshop on High Performance Computing and Communications for Grand Challenge Applica-

(56) References Cited

OTHER PUBLICATIONS tions: Computer Vision, Speech and Natural Language Processing, and Artificial Intelligence." IEEE Transactions on Knowledge and Data Engineering, vol. 5, No. 1, Feb. 1993, 138-154.

Whiting, Paul G., et al., "A History of Data-Flow Languages," IEEE Annals of the History of Computing, vol. 16, No. 4, 1994, pp. 38-59.

* cited by examiner

SUB-GRAPH INTERFACE GENERATION

CROSS-REFERENCE TO RELATED APPLICATIONS

This application claims priority to U.S. Application Ser. No. 62/270,163, filed on Dec. 21, 2015, incorporated herein by reference.

BACKGROUND

This description relates to generation for sub-graph interfaces for dynamically linked sub-graphs.

Many software applications exist for processing data. Some of these software applications are specified as dataflow graphs. Dataflow graphs typically include a number of data processing components, which are interconnected by links, sometimes referred to as "flows."

In operation, data (e.g., a dataset) is received by a dataflow graph from a database or from some other data storage system. The received data advances through the dataflow graph by propagating through the flows and into the components according to dependencies defined by the interconnection of the components and flows. Each component processes data that it receives according to a predetermined function associated with the component before providing the processed data as output data via one or more flows. At the output of the dataflow graph the processed data is, for example, stored in another data storage system, provided to another downstream system, or presented to a user.

A developer of a dataflow graph generally specifies the graph by dragging blocks representing components onto a graphical working area (or "canvas") provided by a graphical development environment (GDE) and interconnecting the components with links representing data flows such that the dataflow graph implements a desired functionality. Once the developer is satisfied with their implementation of the dataflow graph they can save the dataflow graph to storage for later use. In general, if the developer needs to alter the their implementation of the dataflow graph at a later time, they cause the GDE to read the saved dataflow graph from storage, make changes to the dataflow graph, and then re-save the altered dataflow graph to storage.

In some examples, the components of a dataflow graph are themselves implemented using dataflow graphs which are referred to as "sub-graphs." To alter a sub-graph of a component that is used in a given dataflow graph, the dataflow graph is read from disk, the sub-graph component is opened such that its sub-graph can be edited, changes to the sub-graph are made, and the dataflow graph itself is re-saved to storage, thereby embedding the changes to the sub-graph in the saved dataflow graph.

SUMMARY

In a general aspect, a method includes receiving a specification including a description of a first directed graph including a first number of components interconnected by a first set of one or more directed links, forming a graph interface for the first number of components including, forming a first interface element of the graph interface, the first interface element being associated with a first port of a first component of the first number of components, and configuring one or more properties of the first interface element such that the first port of the first component is consistent with the one or more properties of the first interface element, forming a first implementation of the graph interface including the first number of components, the forming including forming a first correspondence between the first interface element and the first port of the first component of the first number of components, and storing the first implementation of the graph interface in a data storage system.

Aspects may include one or more of the following features.

The method may include storing, in the data storage system, a specification including a description of a second directed graph including a second number of components interconnected by a second set of one or more directed links, identifying an instance of the first number of components interconnected by the first set of one or more directed links of the first directed graph in the second directed graph, and replacing the identified instance of the first number of components interconnected by the first set of one or more directed links in the second directed graph with the graph interface. Configuring the one or more properties of the first interface element may include determining one or more descriptors of data or computational characteristics associated with the first port of the first component and configuring the one or more properties of the first interface element based on the determined one or more descriptors.

Configuring the one or more properties of the first interface element based on the determined one or more descriptors may include determining a direction of propagation of one or more descriptors of data or computational characteristics associated with the first port of the first component and configuring the one or more properties of the first interface element based on the determined direction of propagation.

Determining a direction of propagation of one or more descriptors of data or computational characteristics associated with the first port of the first component may include identifying the first port as a port that propagates descriptors of data or computational characteristics to the first interface element and assigning an outward direction of propagation to the first interface element based on the identification. Determining the direction of propagation of one or more descriptors of data or computational characteristics associated with the first port of the first component may include identifying the first port as a port that does not propagate descriptors of data or computational characteristics to the first interface element and assigning an inward direction of propagation to the first interface element based on the identification.

Forming the graph interface may include forming a second interface element of the graph interface, the second interface element being associated with a second port of a second component of the first number of components, determining a direction of propagation of one or more descriptors of data or computational characteristics associated with the second port of the second component including identifying the second port as a port that does not propagate descriptors of data or computational characteristics to the second interface element and assigning an inward direction of propagation to the second interface element based on the identification, and identifying a relationship between the one or more descriptors of data or computational characteristics associated with the first port of the first component and the one or more descriptors of data or computational characteristics associated with the second port of the second component and forming a representation of the identified relationship between the first interface element and the second interface element.

The representation of the relationship may includes a constraint indicating that one or more descriptors of data or computational characteristics associated with the first interface element are the same as one or more descriptors of data or computational characteristics associated with the second interface element. The method may include modifying the one or more properties of the first interface element such that ports of one or more other components conform to the one or more properties of the first interface element. Modifying the one or more properties of the first interface element may include receiving user input and modifying the one or more properties of the first interface element based on the user input. Modifying the one or more properties of the first interface element may include analyzing the one or more other components to determine one or more descriptors of data or computational characteristics associated with the ports of the one or more other components and modifying the one or more properties of the first interface element based on the determined one or more descriptors of data or computational characteristics associated with the ports of the one or more other components.

Modifying the one or more properties of the first interface element may include analyzing the one or more other components to determine a direction of propagation of one or more descriptors of data or computational characteristics associated with the ports of the one or more other components and modifying the one or more properties of the first interface element based on the determined direction of propagation. Forming the graph interface may include identifying a parameter associated with the first number of components and adding an interface element associated with the parameter to the graph interface. The method may include identifying a parameter value corresponding to the parameter and configuring the graph interface to use the identified parameter value as a default value.

The method may include preparing the second directed graph for execution including reading the first implementation of the graph interface from the data storage system, and inserting the first implementation into the second directed graph including establishing a directed link between the first port of the first component of the first number of components in the first implementation of the graph interface and the first interface element of the graph interface based on the first correspondence between the first interface element and the first port of the first component of the first number of components in the first implementation of the graph interface. The method may include preparing the second directed graph for execution including reading a second implementation of the graph interface, different from the first implementation of the graph interface, from the data storage system, and inserting the second implementation into the second directed graph including establishing a directed link between a port of a component in the second implementation of the graph interface and the first interface element of the graph interface based on a second correspondence between the first interface element and the port of the component in the second implementation of the graph interface.

The first interface element may include a flow junction for joining a directed link connected to the first port of the first component of the first number of components to a port of another component not included in the first number of components.

In another general aspect, software stored in a non-transitory form on a computer-readable medium includes instructions for causing a computing system to receive a specification including a description of a first directed graph including a first number of components interconnected by a first set of one or more directed links, form a graph interface for the first number of components including, forming a first interface element of the graph interface, the first interface element being associated with a first port of a first component of the first number of components, and configuring one or more properties of the first interface element such that the first port of the first component is consistent with the one or more properties of the first interface element, form a first implementation of the graph interface including the first number of components, the forming including forming a first correspondence between the first interface element and the first port of the first component of the first number of components, and store the first implementation of the graph interface in the data storage system.

In another general aspect, a computing system includes an input device configured to receive a specification including a description of a first directed graph including a first number of components interconnected by a first set of one or more directed links, and at least one processor configured to process the specification. The processing includes forming a graph interface for the first number of components including, forming a first interface element of the graph interface, the first interface element being associated with a first port of a first component of the first number of components, and configuring one or more properties of the first interface element such that the first port of the first component is consistent with the one or more properties of the first interface element, forming a first implementation of the graph interface including the first number of components, the forming including forming a first correspondence between the first interface element and the first port of the first component of the first number of components, and storing the first implementation of the graph interface in the data storage system.

In another general aspect, a computing system includes means for receiving a specification including a description of a first directed graph including a first number of components interconnected by a first set of one or more directed links, and means for processing the specification. The processing includes forming a graph interface for the first number of components including, forming a first interface element of the graph interface, the first interface element being associated with a first port of a first component of the first number of components, and configuring one or more properties of the first interface element such that the first port of the first component is consistent with the one or more properties of the first interface element, forming a first implementation of the graph interface including the first number of components, the forming including forming a first correspondence between the first interface element and the first port of the first component of the first number of components, and storing the first implementation of the graph interface in the data storage system.

In another general aspect, a method for determining a graph interface includes receiving a specification including a description of a first directed graph including a number of components interconnected by directed links, and forming a graph interface for the first directed graph including: analyzing the first directed graph to identify information for forming one or more interface elements of the graph interface, each of at least some interface elements of the one or more interface elements being associated with one or more properties including at least one of a metadata descriptor property or a direction of metadata propagation property, and for each of at least some interface elements of the one or more interface elements, analyzing the first directed graph to determine whether a value of the metadata descriptor property associated with the interface element is propagated to the interface element from the first directed graph or is propagated to the interface element from a second directed graph that is a container graph in which the graph interface is utilized, and configuring the direction of metadata propagation property for the interface element based on a result of the analysis.

Aspects may include one or more of the following features.

The metadata descriptor property associated with the interface element may include a data characteristic of data transferred via the interface element or a computational characteristic of one or more of the number of components. The data characteristic may include a format of fields of records within the transferred data. The computational characteristic may include a degree of parallelism of execution of a computation represented by one or more of the number of components. Forming a graph interface for the first directed graph may include, for each of at least some interface elements of the one or more interface elements, analyzing the first directed graph to determine that the one or more properties associated with the interface element specify that the interface element is configured to transfer a parameter value through the graph interface. Determining whether the value of the metadata descriptor property associated with the interface element is propagated to the interface element from the first directed graph or is propagated to the interface element from the second directed graph may include determining that the value of the metadata descriptor property associated with the interface element is propagated to the interface element from the first directed graph based on an identification of a component of the number of components that propagates a value of the metadata descriptor property to the interface element.

Determining whether the value of the metadata descriptor property associated with the interface element is propagated to the interface element from the first directed graph or is propagated to the interface element from the second directed graph may include determining that the value of the metadata descriptor property associated with the interface element is propagated to the interface element from the second directed graph based on a determination that no component of the number of components propagates a value of the metadata descriptor property to the interface element. Forming the graph interface for the first directed graph may include determining that two or more of the interface elements are each necessarily associated with a same property. The method may include storing, in a data storage system, a representation of the graph interface and a representation of the first directed graph. At least some of the one or more interface elements may include a flow junction for joining a directed link connected to a port of a component of the number of components to a port of another component not included in the number of components.

In another general aspect, software stored in a nontransitory form on a computer-readable medium, for determining a graph interface includes instructions for causing a computing system to receive a specification including a description of a first directed graph including a number of components interconnected by directed links, and form a graph interface for the first directed graph including: analyzing the first directed graph to identify information for forming one or more interface elements of the graph interface, each of at least some interface elements of the one or more interface elements being associated with one or more properties including at least one of a metadata descriptor property or a direction of metadata propagation property, and for each of at least some interface elements of the one or more interface elements, analyzing the first directed graph to determine whether a value of the metadata descriptor property associated with the interface element is propagated to the interface element from the first directed graph or is propagated to the interface element from a second directed graph that is a container graph in which the graph interface is utilized, and configuring the direction of metadata propagation property for the interface element based on a result of the analysis.

In another general aspect, a computing system for determining a graph interface includes an input device configured to receive a specification including a description of a first directed graph including a number of components interconnected by directed links, and at least one processor configured to process the specification, the processing including forming a graph interface for the first directed graph including: analyzing the first directed graph to identify information for forming one or more interface elements of the graph interface, each of at least some interface elements of the one or more interface elements being associated with one or more properties including at least one of a metadata descriptor property or a direction of metadata propagation property, and for each of at least some interface elements of the one or more interface elements, analyzing the first directed graph to determine whether a value of the metadata descriptor property associated with the interface element is propagated to the interface element from the first directed graph or is propagated to the interface element from a second directed graph that is a container graph in which the graph interface is utilized, and configuring the direction of metadata propagation property for the interface element based on a result of the analysis.

In another general aspect, a computing system for determining a graph interface includes means for receiving a specification including a description of a first directed graph including a number of components interconnected by directed links, and means for processing the specification, the processing including forming a graph interface for the first directed graph including: analyzing the first directed graph to identify information for forming one or more interface elements of the graph interface, each of at least some interface elements of the one or more interface elements being associated with one or more properties including at least one of a metadata descriptor property or a direction of metadata propagation property, and for each of at least some interface elements of the one or more interface elements, analyzing the first directed graph to determine whether a value of the metadata descriptor property associated with the interface element is propagated to the interface element from the first directed graph or is propagated to the interface element from a second directed graph that is a container graph in which the graph interface is utilized, and configuring the direction of metadata propagation property for the interface element based on a result of the analysis.

Aspects can include one or more of the following advantages.

In the context of dataflow graph software development, there is a need for the ability to convert statically linked sub-graphs to dynamically linked sub-graphs, including a sub-graph interface and a corresponding implementation sub-graph. In some examples, doing so is challenging because once a statically linked sub-graph has been excised from its container graph, significant obstacles to metadata propagation may arise.

For example, when an implementation of a sub-graph interface is instantiated in a container graph, the metadata propagation process treats the implementation sub-graph as if all of its vertices are native graph vertices. When the metadata propagation process propagates metadata into the implementation sub-graph, the metadata from the container graph is mixed with the metadata from the implementation sub-graph, which may yield unexpected results. This mixing is exacerbated in the case of layout metadata because the layout algorithm depends in a complex way on a global consideration of weights to assign layouts. Layout metadata specifies computational characteristics such as degree of parallelism, for example, by specifying a number of instances of a component that may be executed (e.g., a maximum number that may be executed, and/or a minimum number that need to be executed), and optionally other information such as specific hosts on which one or more instances will be executed.

Furthermore, multiple different container graphs and implementation sub-graphs can use any given sub-graph interface, each potentially propagating differently through the sub-graph interface. Thus, it is useful to separate properties inherent in the implementation sub-graph(s) from those that happen to be true in any one container or implementation sub-graph.

To do so, aspects described herein automatically generate a sub-graph interface from a specified sub-graph and then allow a user to tighten or loosen metadata constraints associated with the automatically generated sub-graph interface.

Among other advantages, aspects facilitate the creation of dynamically linked sub-graph interfaces that conform to a number of container graphs and sub-graph implementations, resulting in more versatile and reusable sub-graph interfaces.

Aspects guide users through a number of easy to follow steps which result in creation of a dynamically linked sub-graph including a reusable sub-graph interface.

Other features and advantages of the invention will become apparent from the following description, and from the claims.

DESCRIPTION

Figure 1:
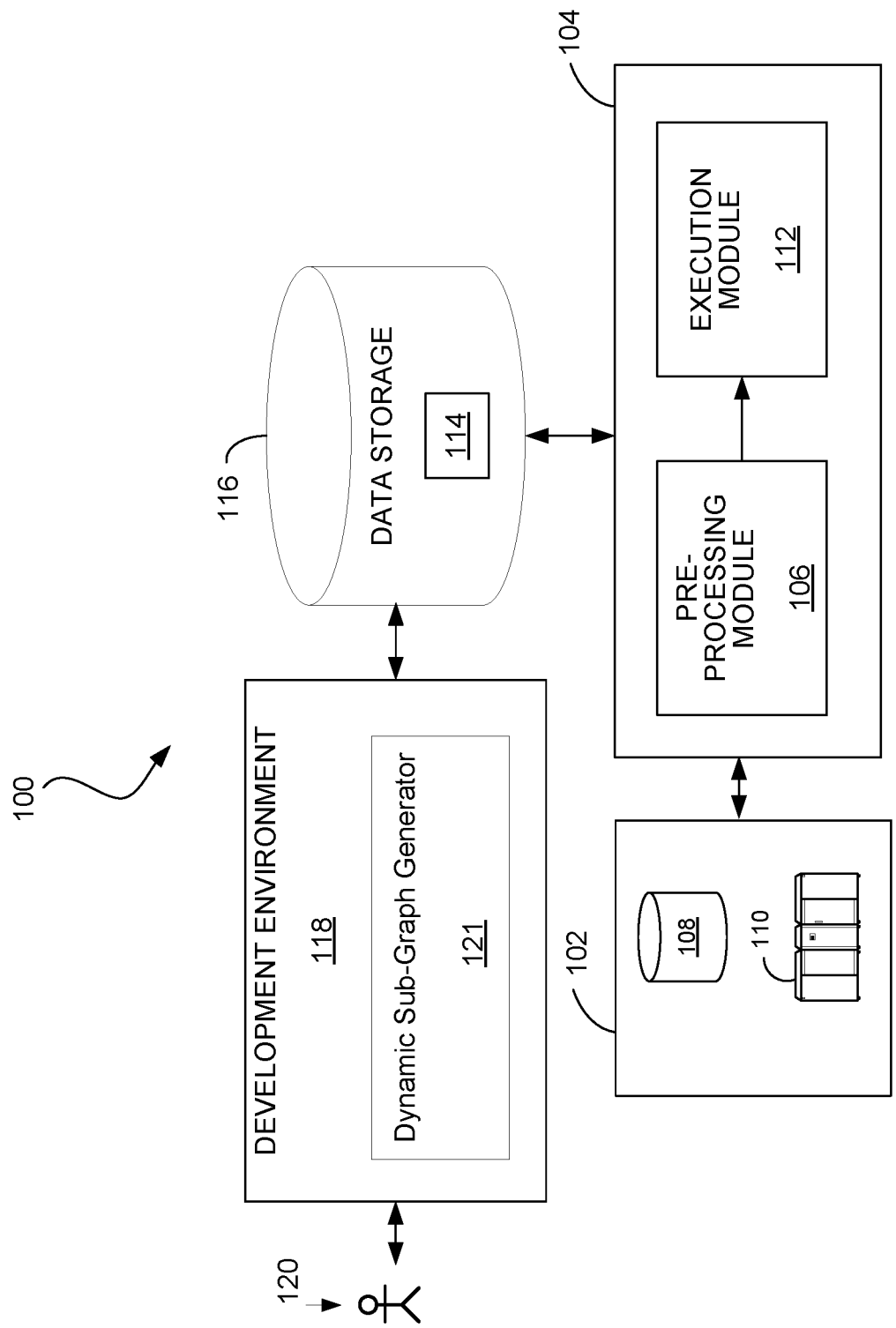
FIG. 1 is a block diagram of a system for sub-graph interface generation.

FIG. 1 shows an example of a data processing system 100 in which the sub-graph interface generation techniques can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a pre-processing module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The pre-processing module 106 reads one or more dataflow graphs 114 from a data storage system 116 and prepares the dataflow graphs for execution by the execution module 112. Part of this preparation process in some cases includes dynamically linking any implementation sub-graphs that conform to any sub-graph interfaces within the dataflow graphs 114. This dynamic linking typically includes metadata propagation. Any sub-graph interfaces that have been automatically generated using the techniques described herein will include elements (called 'interface elements') such as flow junctions or parameters, whose properties have been configured to facilitate this metadata propagation, as described in greater detail below. The pre-processing module 106 then loads a particular dynamically-linked implementation sub-graph that "conforms to" (i.e., is consistent with) a sub-graph interface within a container dataflow graph into that container dataflow graph just before its execution by the execution module 112. For example, a conforming implementation sub-graph should have ports that are consistent with flow junctions on the sub-graph interface, and should have parameter values that are consistent with parameters associated with the sub-graph interface.

The execution environment 104 can receive data from a variety of types of systems that may embody the data source 102, including different forms of database systems. The data may be organized as records having values for respective fields (also called "attributes" or "columns"), including possibly null values. When first reading data from a data source, the execution module 112 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution module 112 processes the data prepared by the pre-processing module 106 to generate output data. The output data may be stored back in the data source 102 or in the data storage system 116 accessible to the execution environment 104, or otherwise used.

The data storage system 116 is also accessible to a development environment 118. A developer 120 can use the development environment 118 to develop applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

In some examples, the development environment 118 includes a dynamic sub-graph generator 121 for generating dynamic sub-graphs from conventional sub-graphs, as is described in greater detail below.

1 Dynamically Linked Sub-Graphs

One specific type of dataflow graph that can be developed in the development environment 118 is referred to as a "dynamically-linked sub-graph." In general, a dynamically-linked sub-graph includes two separate but related components: a sub-graph interface and an implementation sub-graph that conforms to the sub-graph interface. The sub-graph interface includes one or more "flow junctions," which define a point of connection between a flow in the container graph and the sub-graph associated with the sub-graph interface. Each flow junction represents a connection (or "junction") between a flow of data to or from a port on a component of the first dataflow graph and a flow of data to or from a port on a component of the second dataflow graph.

When developing a dataflow graph, the developer can use the sub-graph interface as a placeholder for the implementation sub-graph in the dataflow graph. In some examples, a dataflow graph that includes a sub-graph interface is referred to as a "container dataflow graph," or simply a "container graph."

Figure 2A:
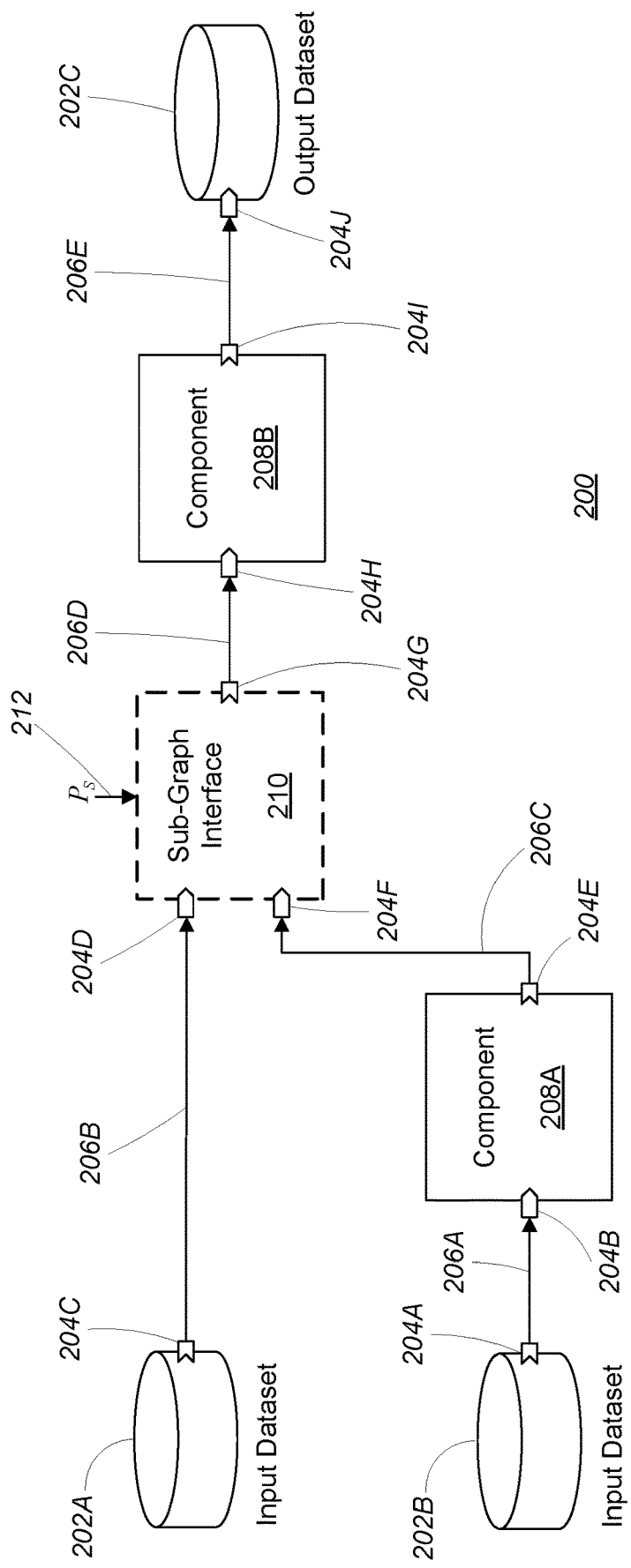
FIG. 2A is a dataflow graph including a sub-graph interface.

Referring to FIG. 2A, one example of a container dataflow graph 200 includes a number of datasets 202A-202C providing data to or receiving data from a number of components 208A-208B and a sub-graph interface 210, all of which have ports 204A-204J interconnected by flows 206A-206E. In the container dataflow graph 200, there are no components statically linked into the dataflow graph in the place of the sub-graph interface 210. Instead, the sub-graph interface 210 serves as a placeholder in the dataflow graph 200 which will later be replaced by an implementation sub-graph that conforms to the sub-graph interface 210.

Figure 2B:
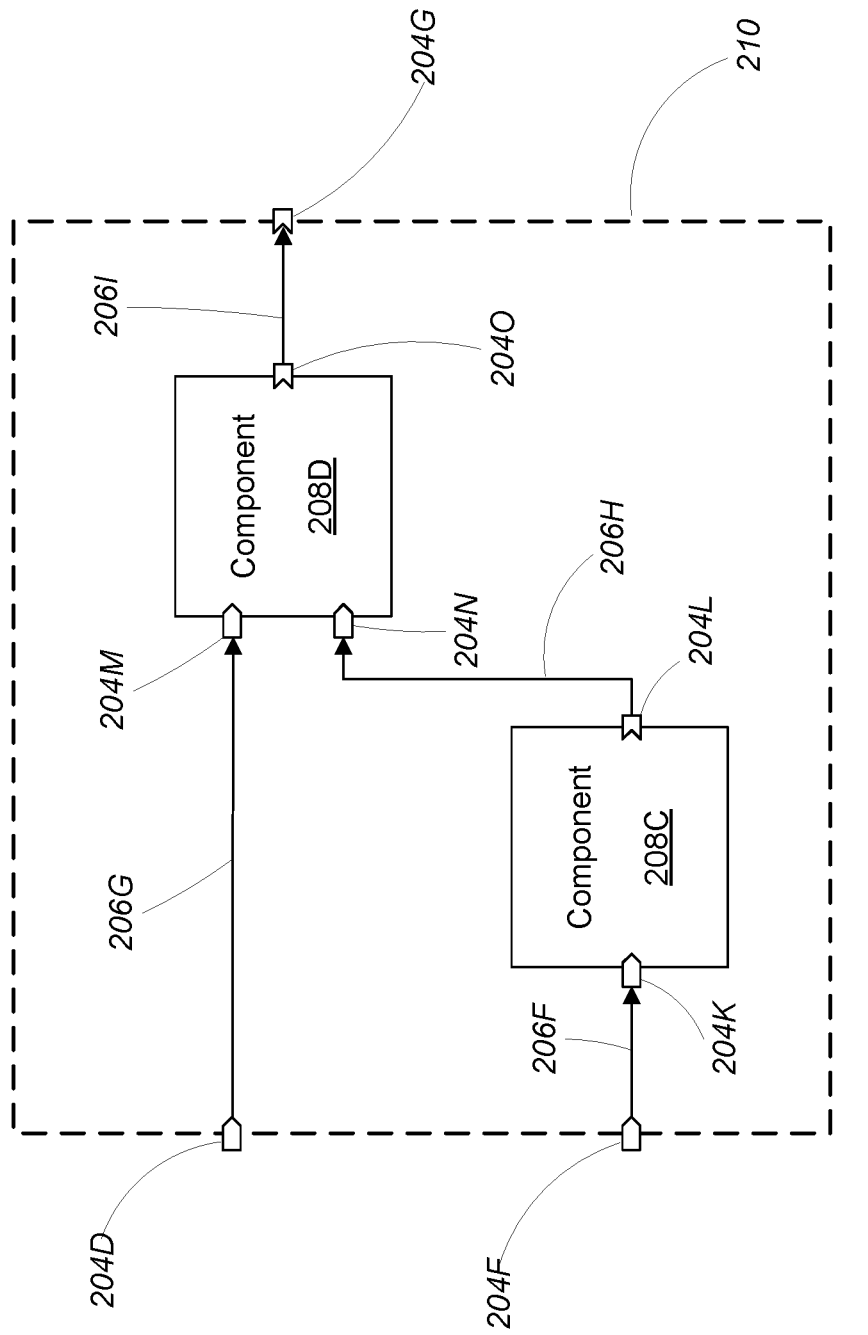
FIG. 2B is an implementation of the sub-graph interface.

Referring to FIG. 2B, one example of an implementation sub-graph 201 corresponding to the sub-graph interface 210 of FIG. 2A includes a number of components 208C-208D and ports 204D, 204F, 204G, and 204K-204O interconnected by flows 206F-206I. Since the implementation sub-graph 201 is a implementation of the sub-graph interface 210 of FIG. 2A, the implementation sub-graph has input flows 206G, 206F corresponding to input ports on the sub-graph interface 210 and output flows corresponding to output ports on the sub-graph interface 210.

At some time after development of the container dataflow graph 200 (e.g., just prior to running the container dataflow graph 200), the dataflow graph is prepared for execution. One step in preparing the dataflow graph for execution includes linking the implementation sub-graph 201 into the container dataflow graph 200, thereby forming a combined dataflow graph by replacing the sub-graph interface 210 in the container dataflow graph 200 with the implementation sub-graph 201.

Figure 2C:
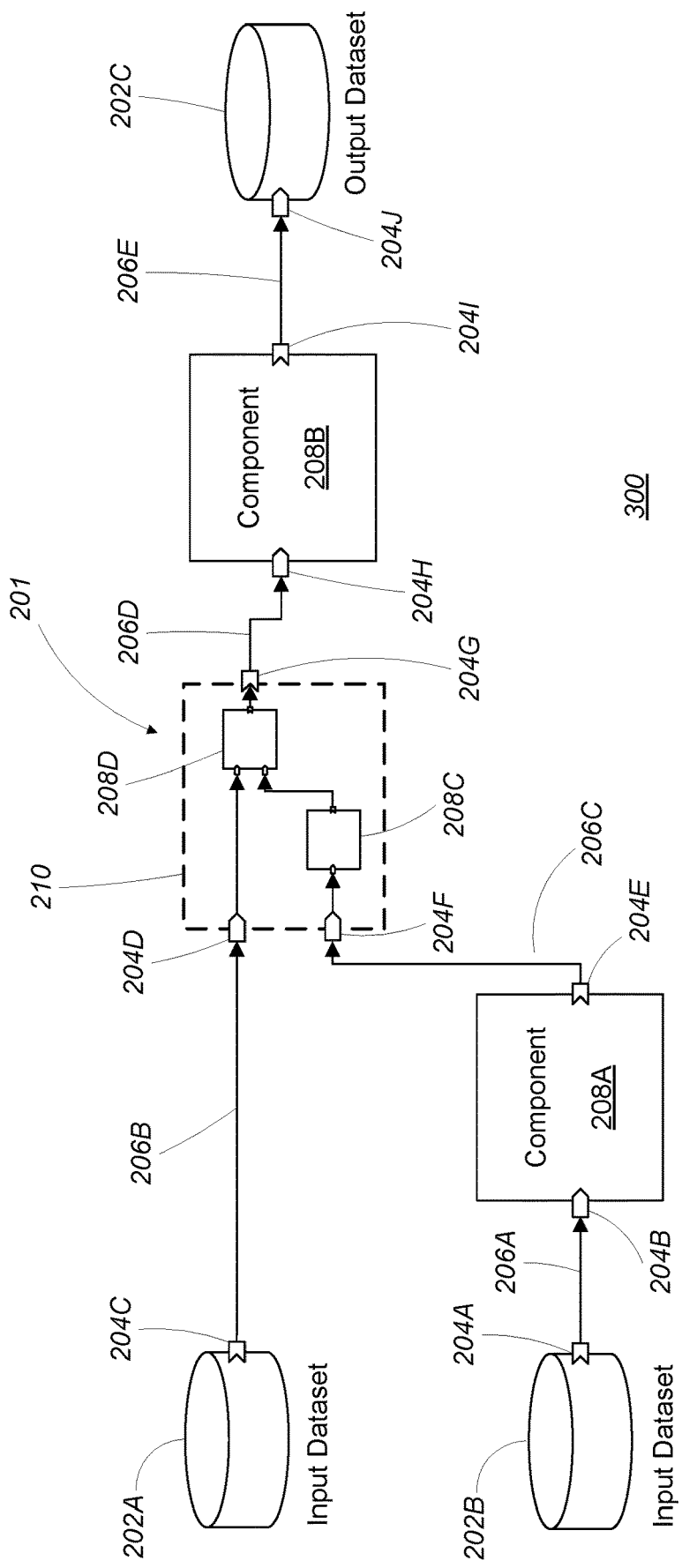
FIG. 2C is a combined dataflow graph.

For example, referring to FIG. 2C, a combined dataflow graph 300 includes the container dataflow graph 200 of FIG. 2A with the implementation dataflow graph 201 of FIG. 2B linked in place of the sub-graph interface 210. Since the implementation dataflow graph 201 conforms to the sub-graph interface 210, all of the input and output ports of the implementation dataflow graph 201 are connected to the components of the container dataflow graph 200 via flows. After formation of the combined dataflow graph 300 by linking the implementation sub-graph 201 into the container dataflow graph 200, the combined dataflow graph 300 can be compiled and executed.

The above description of dynamically linked sub-graphs is intended to serve as a primer on the subject and not an exhaustive description of the subject. A more detailed description of dynamically linked sub-graphs can be found in U.S. patent application Ser. No. 14/561,494, titled "MANAGING INTERFACES FOR SUB-GRAPHS," incorporated herein by reference.

2 Dynamically Linked Sub-Graph Generation

In some examples, such as those described in U.S. patent application Ser. No. 14/561,494, titled "MANAGING INTERFACES FOR SUB-GRAPHS," sub-graph interfaces are user-specified and users write implementation sub-graphs that conform to the sub-graph interfaces. In other examples, there is a need to generate sub-graph interfaces and implementation sub-graphs from existing, conventional (i.e., statically linked) sub-graphs.

Figure 3:
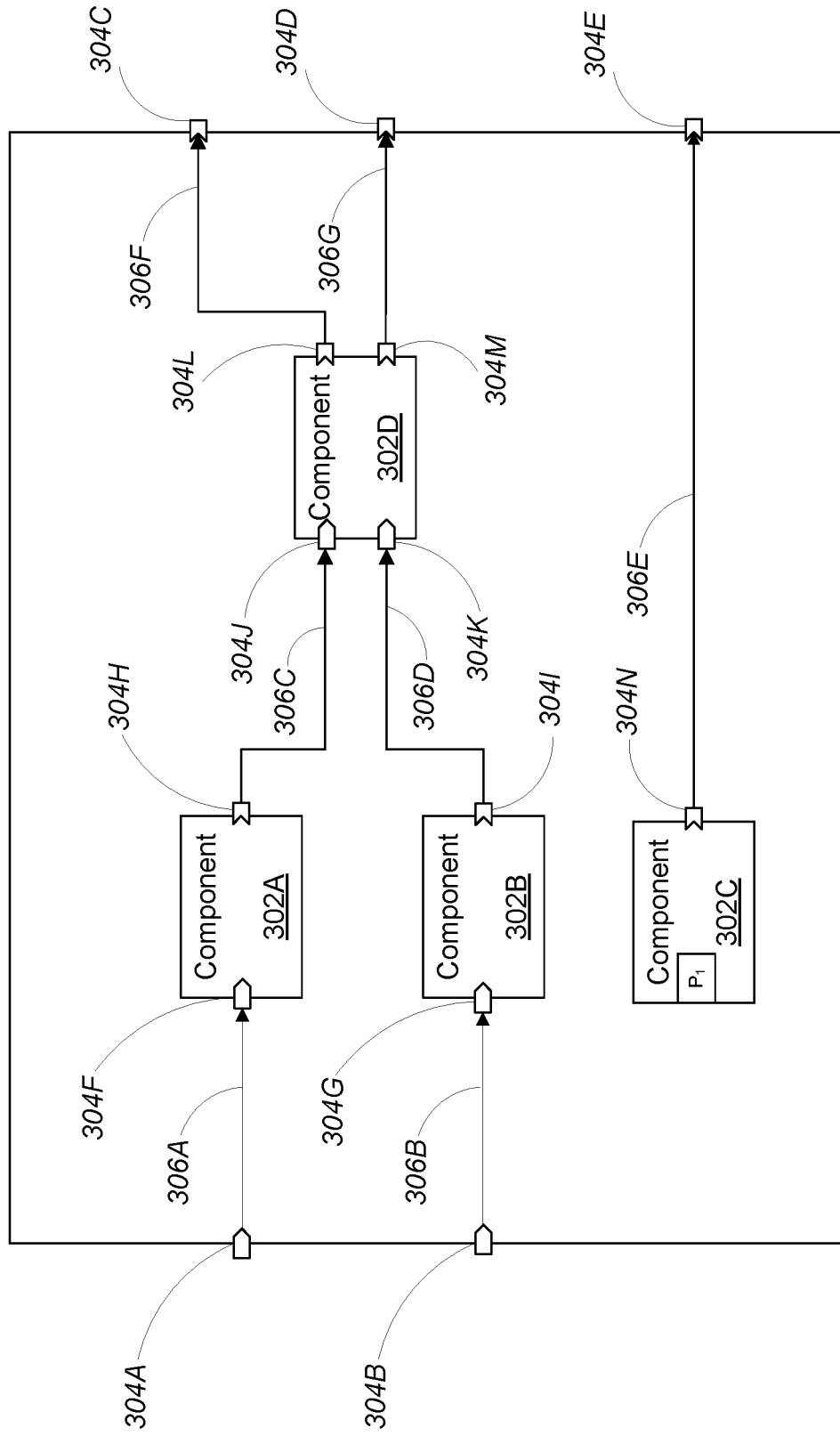
FIG. 3 is a dataflow graph specified for dynamically linked sub-graph generation.

For example, referring to FIG. 3, to initiate generation of a dynamically linked sub-graph from a conventional sub-graph, a conventional sub-graph 400 is first specified using the development environment 118 (e.g., by a user selecting a file representing the conventional sub-graph 400 from disk).

2.1 Specified Sub-Graph Overview

In this example, a block diagram of the specified sub-graph 400 is configured to process data received from a first input port, 304A and a second input port, 304B using a number of components 302A-302C and to write the processed data to a first output port, 304C, a second output port, 304D, and a third output port, 304E. The sub-graph 400 includes a first component 302A, a second component 302B, a third component 302C, and a fourth component 302D. Each of the components has one or both of input ports for receiving input data and output ports for providing output data (e.g. ports 304F-304N). In general, each component applies one or more computations to the input data flowing into its input port(s) and provides the result of the computation(s) as output via its output port(s). It is noted that certain types of components (e.g., the third component 302C) may include only input ports or only output ports.

The input and output ports of the sub-graph 400 are interconnected by flows 306A-306G which define how data propagates between the ports and components of the sub-graph 400. Specifically, the first input port 304A included on the boundary of the sub-graph 400 is connected to a third input port 304F included on the first component 302A by a first flow 306A. The second input port 304B included on the boundary of the sub-graph 400 is connected to a fourth input port 304G included on the second component 302B by a second flow 306B. A fourth output port 304H included on the first component 302A is connected to a fifth input port 304J included on the fourth component 302D by a third flow 306C. A fifth output port 304I included on the second component 302B is connected to a sixth input port 304K included on the fourth component 302D by a fourth flow 306D.

A sixth output port 304N included on the third component 302C is connected to the third output port 304E on the boundary of the sub-graph 400 by a fifth flow 306E. A seventh output port 304L included on the fourth component 302D is connected to the first output port 304C on the boundary of the sub-graph 400 by a sixth flow 306F. An eighth output port 304M included on the fourth component 302D is connected to the second output port 304D on the boundary of the sub-graph 400 by a seventh flow 306G. The third component 302C is configurable by a parameter, $P_1$.

2.2 Dynamic Sub-Graph Generator

Figure 4:
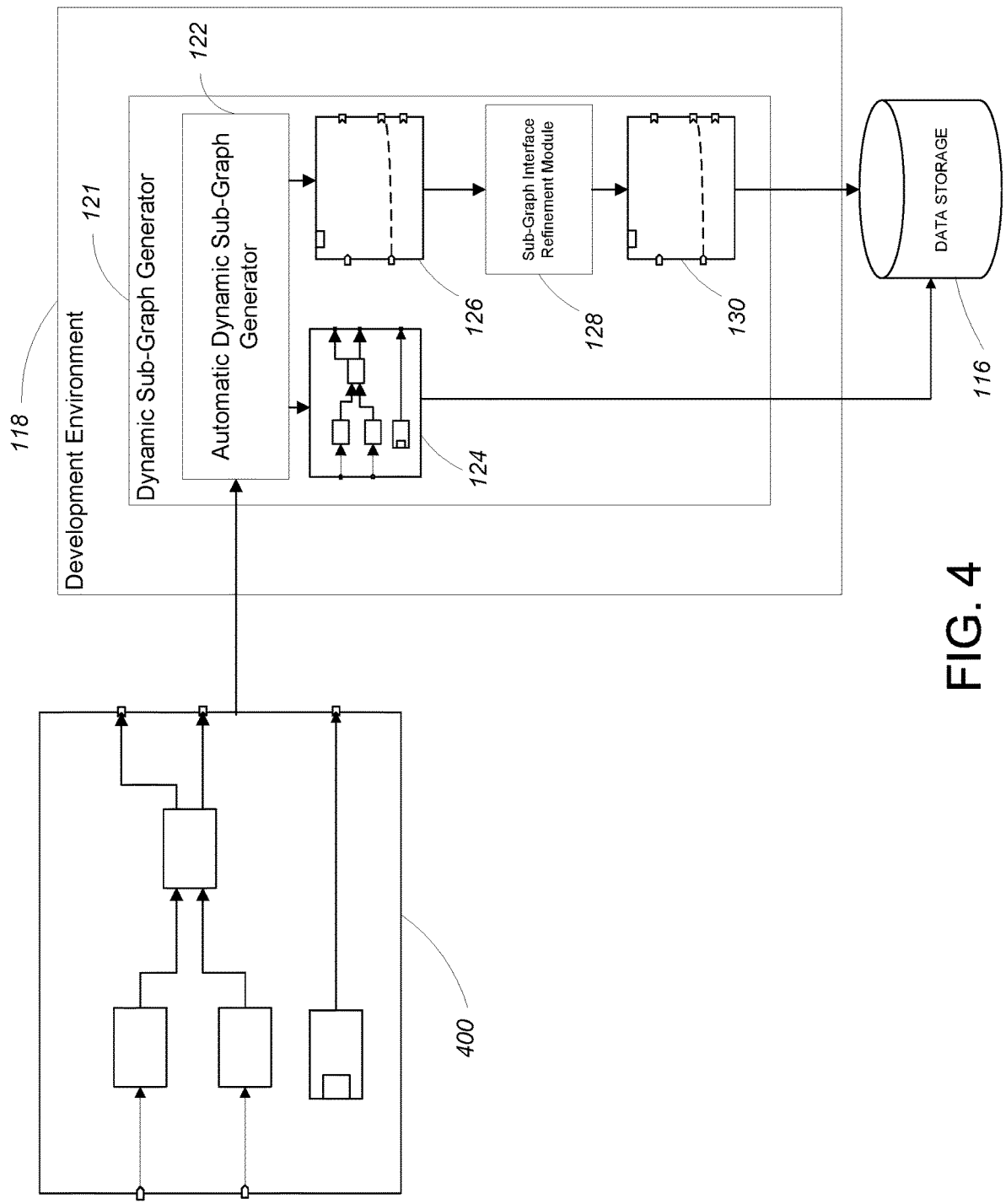
FIG. 4 is a block diagram of a development environment for dynamically linked sub-graph generation.

Referring to FIG. 4, to generate a dynamically linked sub-graph from the specified sub-graph 400, the specified sub-graph 400 is first read into the dynamic sub-graph generator 121 of the development environment 118. In some examples, the sub-graph generator 121 includes an automatic dynamic sub-graph generator 122 and a sub-graph interface refinement module 128. Very generally, the automatic dynamic sub-graph generator 122 automatically generates an initial sub-graph interface 126, and optionally an implementation sub-graph 124 for the specified sub-graph 400, and the sub-graph interface refinement module 128 performs an automated refinement process, optionally configured to receive user input, to modify the initial sub-graph interface 126 to generate a final sub-graph interface 130. In some examples, the final sub-graph interface 130 has properties that are more or less restrictive than those of the initial sub-graph interface 126 in the sense that certain ports on the interface 130 may be designated as optional or the metadata constraints associated with certain ports on the interface 130 may be eased such that the final sub-graph interface 130 can accommodate a greater number of implementation sub-graphs. The final sub-graph interface 130 is, optionally, stored in the data storage 116 for later use.

In some examples, for at least some of the modifications made to the sub-graph interface 126, the sub-graph interface refinement module 128 also makes corresponding modifications to the implementation sub-graph 124. In some examples, no implementation sub-graph 124 is generated, and the sub-graph interface 130 is used on its own for potential future development of one or more implementation sub-graphs.

2.2.1 Automatic Dynamic Sub-Graph Generator

Figure 5:
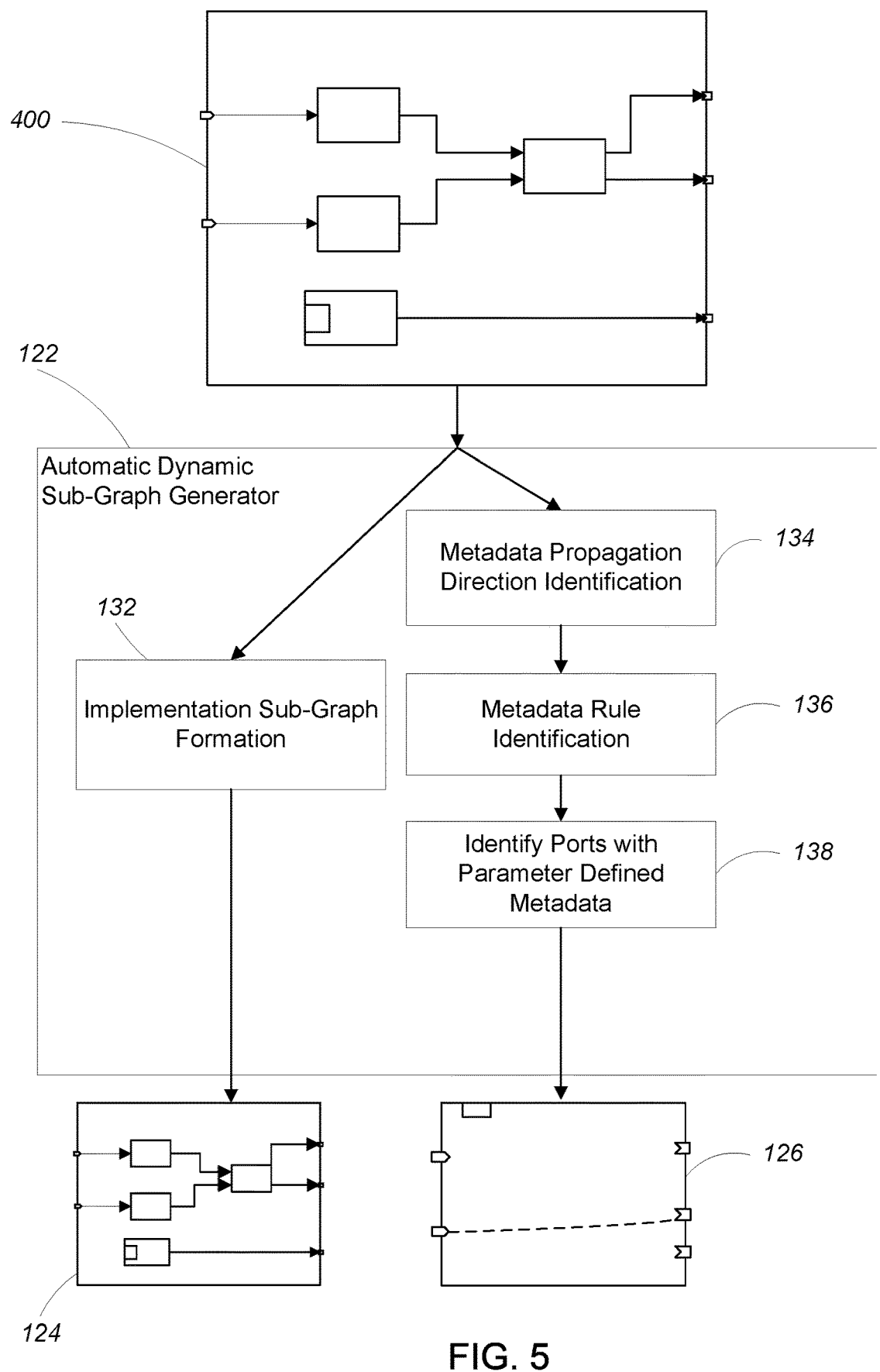
FIG. 5 is a block diagram of an automatic dynamic sub-graph generator.

Referring to FIG. 5, the automatic dynamic sub-graph generator 122 receives the specified sub-graph 400 and provides the specified sub-graph 400 to an implementation sub-graph formation module 132 and a metadata propagation direction identification module 134.

2.2.1.1 Implementation Sub-Graph Formation

The implementation sub-graph formation module 132 processes the specified sub-graph 400 to generate the implementation sub-graph 124, which is passed out of the dynamic sub-graph generator 122 as output. In some examples, the implementation sub-graph 124 is formed by first making a copy of the specified sub-graph 400. Then, as is described above, for at least some modifications made to the sub-graph interface 126, the sub-graph interface refinement module 128 also makes corresponding modifications to the copy of the specified sub-graph 400 to form the implementation sub-graph 124. For example, flow junctions marked as "inward" propagating on the sub-graph interface 126 may also be marked as "inward" propagating on the implementation sub-graph 124. Furthermore, certain edits to the internal structure of the implementation sub-graph 124 may need to be made to support the designated propagation direction.

2.2.1.2 Metadata Propagation Direction Identification

The metadata propagation direction identification module 134 forms an initial sub-graph interface by identifying flow junctions corresponding to ports on the boundary of the specified sub-graph and determines a direction of metadata propagation for each of the identified flow junctions.

Before describing the operation of the metadata propagation direction identification module 134, a brief primer on metadata propagation is presented. In dataflow graphs, it is important that metadata associated with the ports of components in the dataflow graph and/or metadata associated with the components themselves is managed. In some examples, metadata includes a descriptor of data (e.g., a record format for a port including a sequence of fields and data types of records flowing into or out of a port) or a computational characteristic (e.g., a partitioning or a layout for a component). In other examples, metadata may include an amount of memory a component may use, which computing resources a component may use, sortedness, compression method, character set, binary representation (e.g., big-endian, little-endian), or data transformations.

Metadata management can be accomplished manually, automatically, or by using a combination of manual and automatic metadata management. For manual metadata management, metadata is supplied, for example, by a graph developer or by a graph user. For automatic metadata management, metadata is propagated from portions of the graph with known (i.e., explicitly defined) metadata to portions of the graph with unknown metadata. Metadata propagation is necessary when metadata for a given port or component is not directly supplied by a graph user or developer. In such a case, the metadata for the given port or component must be derived from other ports or components in the graph. The term metadata propagation as is used herein refers to this derivation process.

In a conventional dataflow graph including conventional components and datasets this propagation of explicitly defined metadata through the dataflow graph results in metadata being associated with all components in the dataflow graph. Any conflicts arising in metadata propagation are generally flagged for developer intervention. However, metadata propagation for dataflow graphs including a sub-graph interface is generally handled differently than metadata propagation for dataflow graphs including only conventional components. In particular, metadata may be propagated in two stages: an edit-time metadata propagation stage and a link-time metadata resolution stage.

This two stage approach is used since, at edit-time, the container graph (i.e., the graph including a sub-graph interface as a component) and the implementation sub-graph (i.e., the sub-graph which conforms to the sub-graph interface) that will be linked in place of the sub-graph interface are not aware of each other's metadata information. Without access to this information, conventional metadata propagation has no way of knowing whether metadata should be propagated in a direction "inward" into the implementation sub-graph (i.e., the container graph acts as a source of metadata for the implementation sub-graph) or in a direction "outward" from the implementation sub-graph (i.e., the container graph acts as a sink for metadata from the implementation sub-graph).

Thus, to make metadata propagation in a dataflow graph including a sub-graph interface possible, each flow junction of the sub-graph interface specifies a direction of metadata propagation. In some examples, the set of possible directions of metadata propagation includes "inward" propagation and "outward" propagation.

When a flow junction on the sub-graph interface is declared as having a metadata propagation direction of "inward," metadata propagation in the container graph supplies a metadata definition via the flow connected to the flow junction (and eventually to a port connected to a flow in the implementation sub-graph). That is, in the container graph, edit-time metadata propagation treats the flow junction as a metadata sink.

When a flow junction on the sub-graph interface is declared as having a metadata propagation direction of "outward," metadata propagation in the implementation sub-graph supplies a metadata definition for the flow junction to the container graph. That is, in the container graph, edit-time metadata propagation treats the flow junction as a metadata source even though an edit-time definition for the metadata is not present (since the definition is only available from the implementation sub-graph at link-time).

The metadata propagation direction identification module 134 identifies known sources (e.g., ports) of metadata in the specified sub-graph 400 and performs a metadata propagation process originating from the identified sources to determine a direction of metadata propagation for ports on the boundary of the specified sub-graph 400 and their corresponding flow junctions on the initial sub-graph interface 126.

Figure 6:
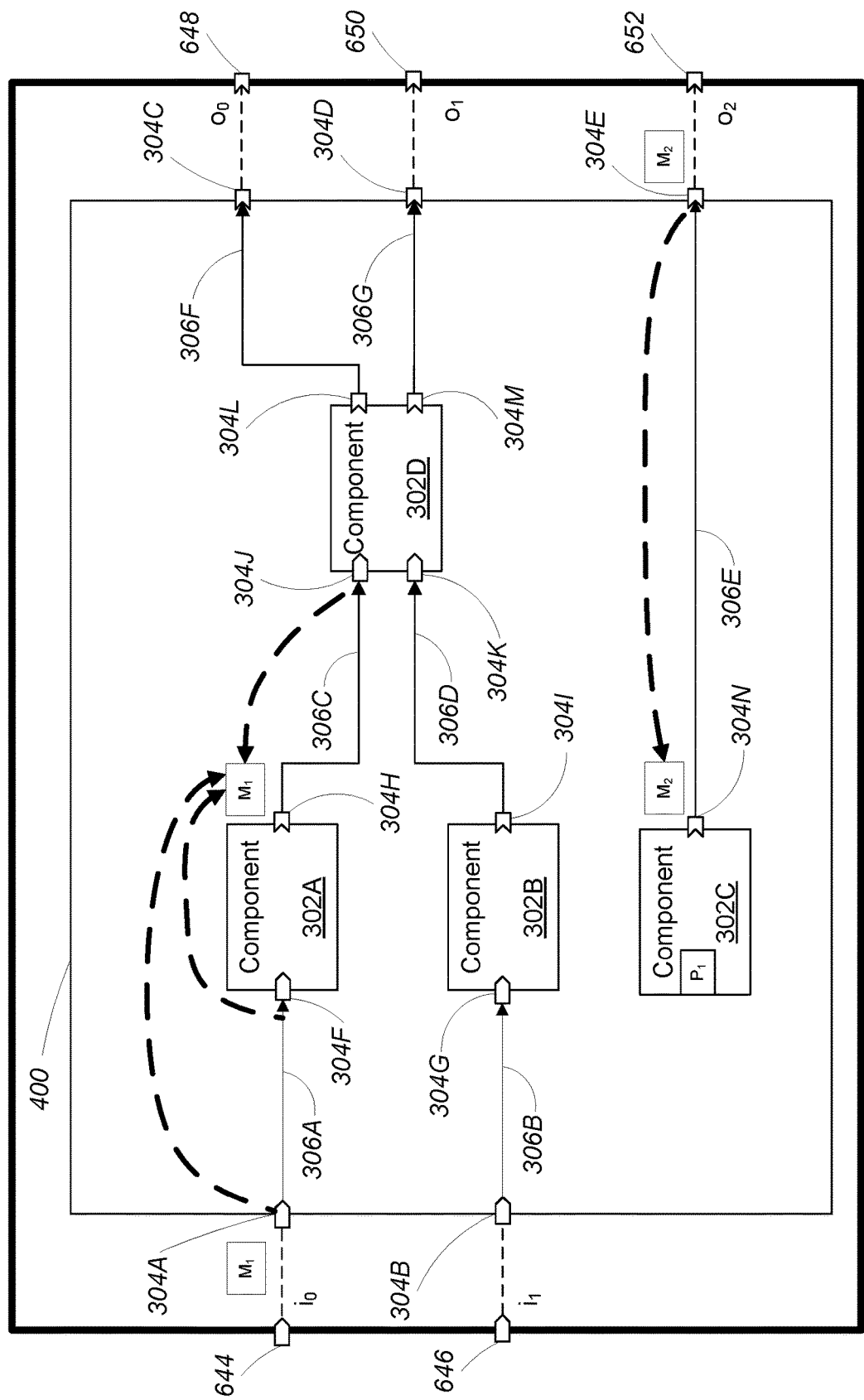
FIG. 6 shows a first edit-time metadata propagation process.

Referring to FIG. 6, in operation, the metadata propagation direction identification module 134 generates the initial sub-graph interface 126 including a first flow junction, $i_0$ 644 corresponding to the first input port 304A of the specified sub-graph 400, a second flow junction, $i_1$ 646 corresponding to the second input port 304B of the specified sub-graph 400, a third flow junction, $o_0$ 648 corresponding to the first output port 304C of the specified sub-graph, a fourth flow junction, $o_1$ 650 corresponding to the second output port 304D of the specified sub-graph 400, and a fifth flow junction $o_2$ corresponding to the third output port 304E of the specified sub-graph 400.

The metadata propagation direction identification module 134 then identifies the fourth output port 304H included on the first component 302A of the specified sub-graph 400 and the sixth output port 304N included on the third component 302C of the specified sub-graph 400 as known sources of metadata (e.g., by analyzing characteristics of the ports). In FIG. 6, the metadata associated with the fourth output port 304H and the sixth output port 304N are denoted $M_1$ and $M_2$, respectively. It is noted however that the notation $M_1$ and $M_2$ is not intended to imply that any specific metadata value is associated with the known sources of metadata. Indeed, in some examples, the specific metadata values associated with the known sources of metadata are unknown and $M_1$ and $M_2$ are simply placeholder metadata values that can be used for propagation. Of course, the placeholder metadata values are known at the time that the container graph executes. In other examples, $M_1$ and $M_2$ may refer to specific metadata values associated with the known sources of metadata.

With the known sources of metadata identified, the metadata propagation direction identification module 134 performs an edit-time metadata propagation process for both of the known sources of metadata.

In doing so, the metadata propagation direction identification module 134 propagates $M_1$ from the fourth output port 304H in an upstream direction (i.e., in a direction toward the first flow junction, $i_0$ 644) and in a downstream direction (i.e., in a direction toward the third flow junction, $o_0$ 648 and the fourth flow junction, $o_1$ 650).

In the upstream direction, the edit-time metadata propagation process determines that the first component 302A does not apply any transformation to the metadata and therefore propagates the metadata, $M_1$ through the component 302A and associates it with the third input port 304F on the first component 302A. In some examples, this association is represented by an arrow (sometimes referred to as a "same as" arrow) pointing from the port where the metadata was propagated to and ending at the port where the metadata originated from (e.g., an arrow pointing from the third input port 304*f* to the fourth output port 304H). $M_1$ is then propagated from the third input port 304F to the first input port 304A on the boundary of the specified sub-graph 400 (resulting in a "same as" arrow pointing from the first input port 304*a* to the fourth output port 304H) and to the first flow junction, $i_0$ 644 associated with the first input port 304A. The first flow junction, $i_0$ 644 is assigned a metadata propagation direction of "outward" since metadata (i.e., $M_1$) is propagated from a known source of metadata to the flow junction 644.

In the downstream direction, the edit-time metadata propagation process propagates $M_1$ from the fourth output port 304H on the first component 302A to the fifth input port 304J on the fourth component 302D (resulting in a "same as" arrow pointing from the fifth input port 304J to the fourth output port 304H). The edit-time metadata propagation process determines that the fourth component 302D does apply a transformation to the metadata and therefore does not propagate $M_1$ any further in the downstream direction.

The edit-time metadata propagation process also propagates $M_2$ from the sixth output port 304N on the third component 302C to the third output port 304E on the boundary of the specified sub-graph 400 and to the fifth flow junction, $o_2$ 652 associated with the third output port 304E (resulting in a "same as" arrow pointing from the third output port 304E to the sixth output port 304N). The fifth flow junction, $o_2$ 652 is assigned a metadata propagation direction of "outward" since metadata (i.e., $M_2$) is propagated from a known source of metadata to the flow junction 652.

Figure 7:
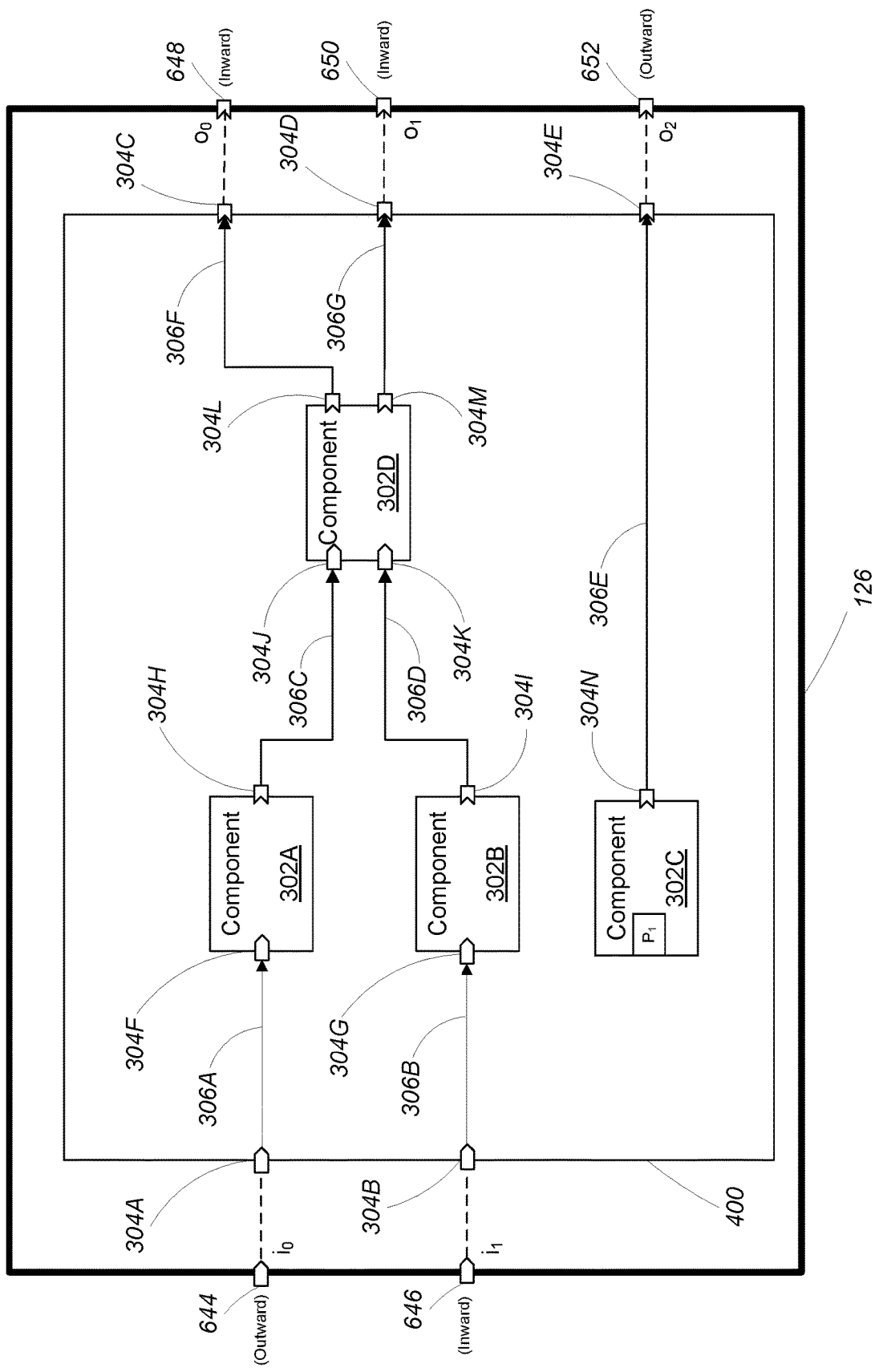
FIG. 7 is an initial sub-graph interface with a direction of metadata propagation determined for its flow junctions.

At the conclusion of the edit-time metadata propagation process, any flow junctions that are not marked as having a metadata propagation direction of "outward" (i.e., have not received propagated metadata) are marked as having a metadata propagation direction of "inward." Referring to FIG. 7, in the present example, only the first flow junction, $i_0$ 644 and the fifth flow junction, $o_2$ 652 were marked by the metadata propagation direction identification module 134 as having a metadata propagation direction of "outward," so the second flow junction, $i_1$ 646, the third flow junction, $o_0$ 648, and the fourth flow junction, $o_1$ 650 are marked by the metadata propagation direction identification module 134 as having a metadata propagation direction of "inward." In some examples, a representation of the propagation that was performed by the metadata propagation direction identification module 134 is stored with the implementation sub-graph 124.

2.2.1.3 Metadata Rule Identification

With the direction of metadata propagation for all flow junctions on the initial sub-graph interface 126 determined, the initial sub-graph interface 126 and the specified sub-graph 400 are provided to the metadata rule identification module 136 which analyzes the specified sub-graph 400 to determine metadata rules for inclusion in the initial sub-graph interface 126.

Figure 8:
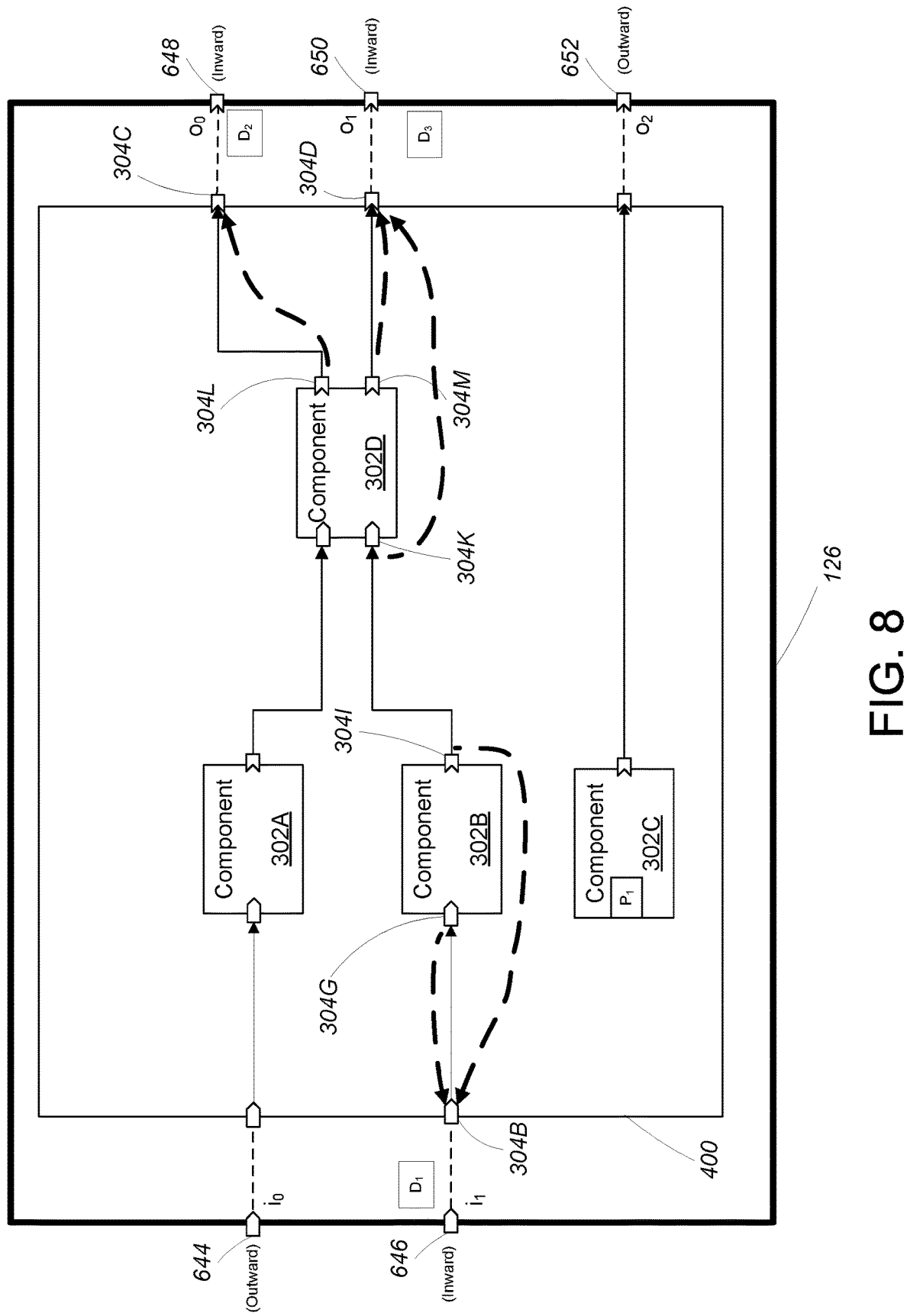
FIG. 8 is a second edit-time metadata propagation process.

To do so, the metadata rule identification module 136 assigns placeholder values to each of the flow junctions with an "inward" direction of metadata propagation and performs another edit-time metadata propagation process to discover relationships that exist between the ports on the boundary of the specified sub-graph 400. The metadata rule identification module 136 uses any relationships that are discovered to assign metadata rules to the flow junctions of the initial sub-graph interface 126. For example, referring to FIG. 8, placeholder metadata $D_1$ is assigned to the second flow junction, $i_1$ 646, placeholder metadata $D_2$ is assigned to the third flow junction, $o_0$ 648, and placeholder metadata $D_3$ is assigned to the fourth flow junction, $o_1$ 650.

The metadata rule identification module 136 propagates $D_1$ from the second input port 304B on the boundary of the specified sub-graph 400 to the fourth input port 304G on the second component 302B (resulting in a "same as" arrow pointing from the fourth input port 304G to the second input port 304B). The edit-time metadata propagation process determines that the second component 302B doesn't apply any transformation to the metadata and therefore propagates $D_1$ through the second component 302B to the fifth output port 304I (resulting in a "same as" arrow pointing from the fifth output port 304I to the second input port 304B).

The metadata rule identification module 136 also propagates $D_2$ from the first output port 304C to the seventh output port 304L (resulting in a "same as" arrow pointing from the first output port 304C to the seventh output port 304L). The edit-time metadata propagation process determines that the fourth component 302D applies a transformation to the metadata, $D_2$ and therefore doesn't propagate $D_2$ any further.

The metadata rule identification module 136 propagates $D_3$ from the second output port 304D to the eighth output port 304M (resulting in a "same as" arrow pointing from the eighth output port 304M to the second output port 304D). The edit-time metadata propagation process determines that the fourth component 302D doesn't apply any transformation to the metadata, $D_3$ and therefore propagates $D_3$ to through the fourth component 302D and to the sixth input port 304K (resulting in a "same as" arrow pointing from the sixth input port 304$k$ to the second output port 304D).

Figure 9:
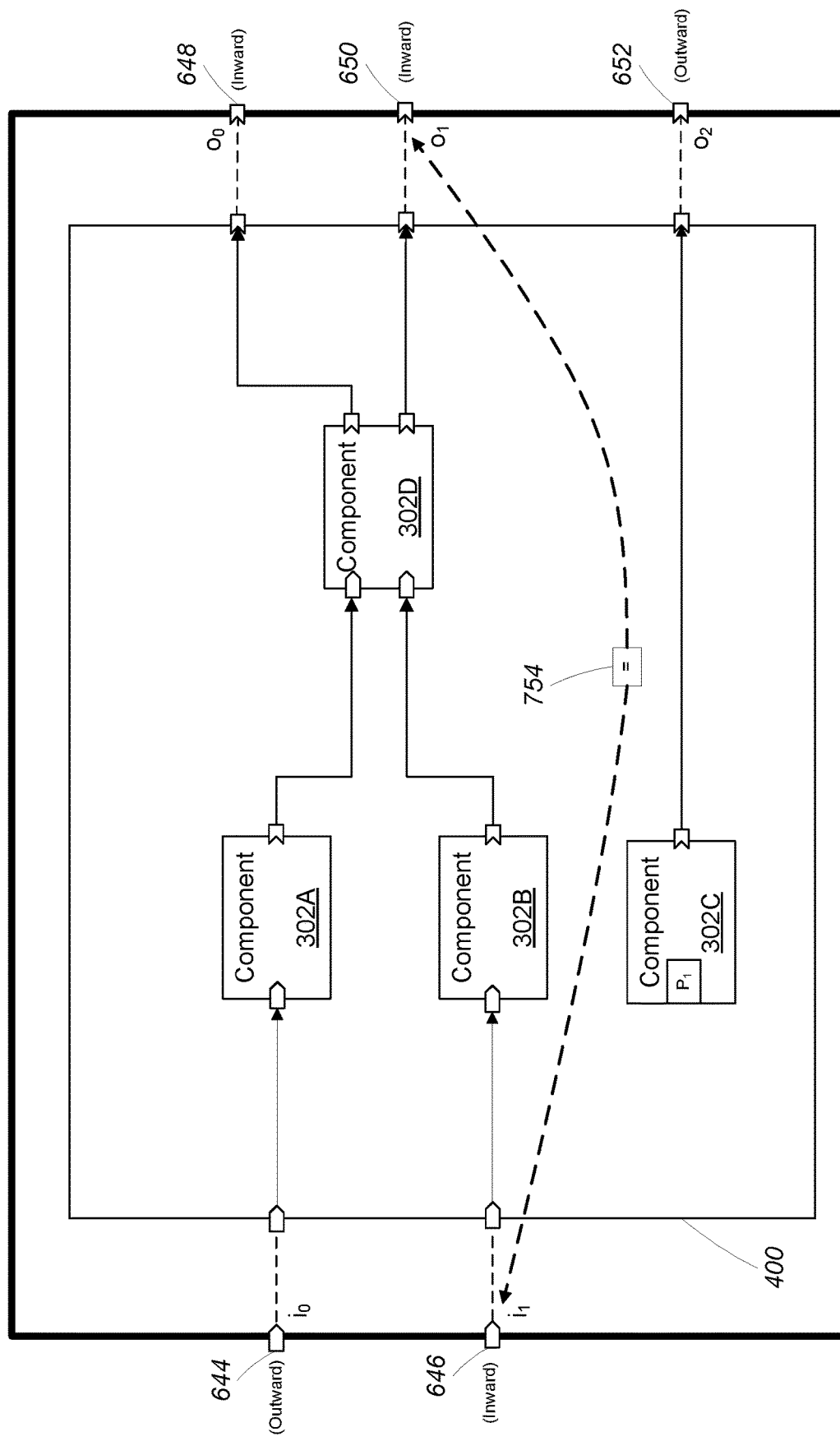
FIG. 9 is the initial sub-graph interface including a metadata rule.

With metadata propagated from all of the ports marked as having an "inward" propagation direction, the metadata rule identification module 136 determines, based on the propagation of $D_1$ and $D_3$, that any metadata associated with the second input port 304B must be equal to the metadata associated with the second output port 304D. Referring to FIG. 9, the metadata rule identification module 136 includes a "copy" metadata rule 754 on the initial sub-graph interface 126 to represent an equality metadata relationship between the second flow junction, $i_1$ 646 and the fourth flow junction, $o_1$ 650.

2.2.1.4 Parameter Identification

Referring again to FIG. 5, with the metadata rules identified, the initial sub-graph interface 126 and the specified sub-graph 400 are provided to the parameter identification module 138 which identifies any ports or components of the specified sub-graph 400 that are not reachable by the edit-time metadata propagation process but are configurable using a parameter associated with the specified sub-graph that does not have a default value in the specified sub-graph 400. The parameter identification module 138 adds a sub-graph interface parameter to the initial sub-graph interface 126 for any parameters that it identifies.

Figure 10:
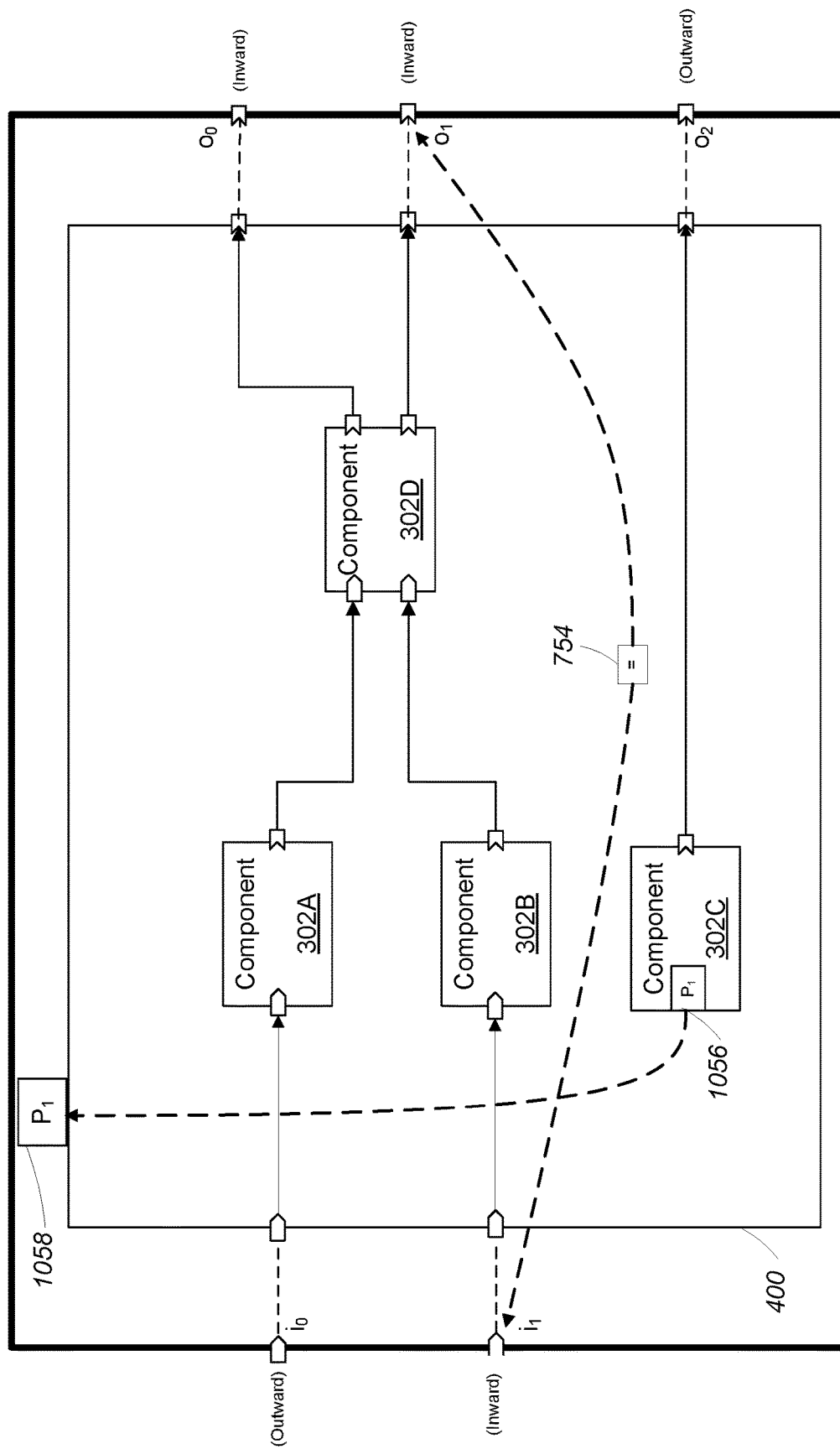
FIG. 10 shows the initial sub-graph interface including a sub-graph interface parameter.

Referring to FIG. 10, the parameter identification module 138 determines that the third component 302C is configurable using a parameter, $P_1$ which does not have a default value in the specified sub-graph 400. The parameter identification module 138 therefore adds a sub-graph interface parameter, $P_1$ 1058 to the initial sub-graph interface 126.

Figure 11:
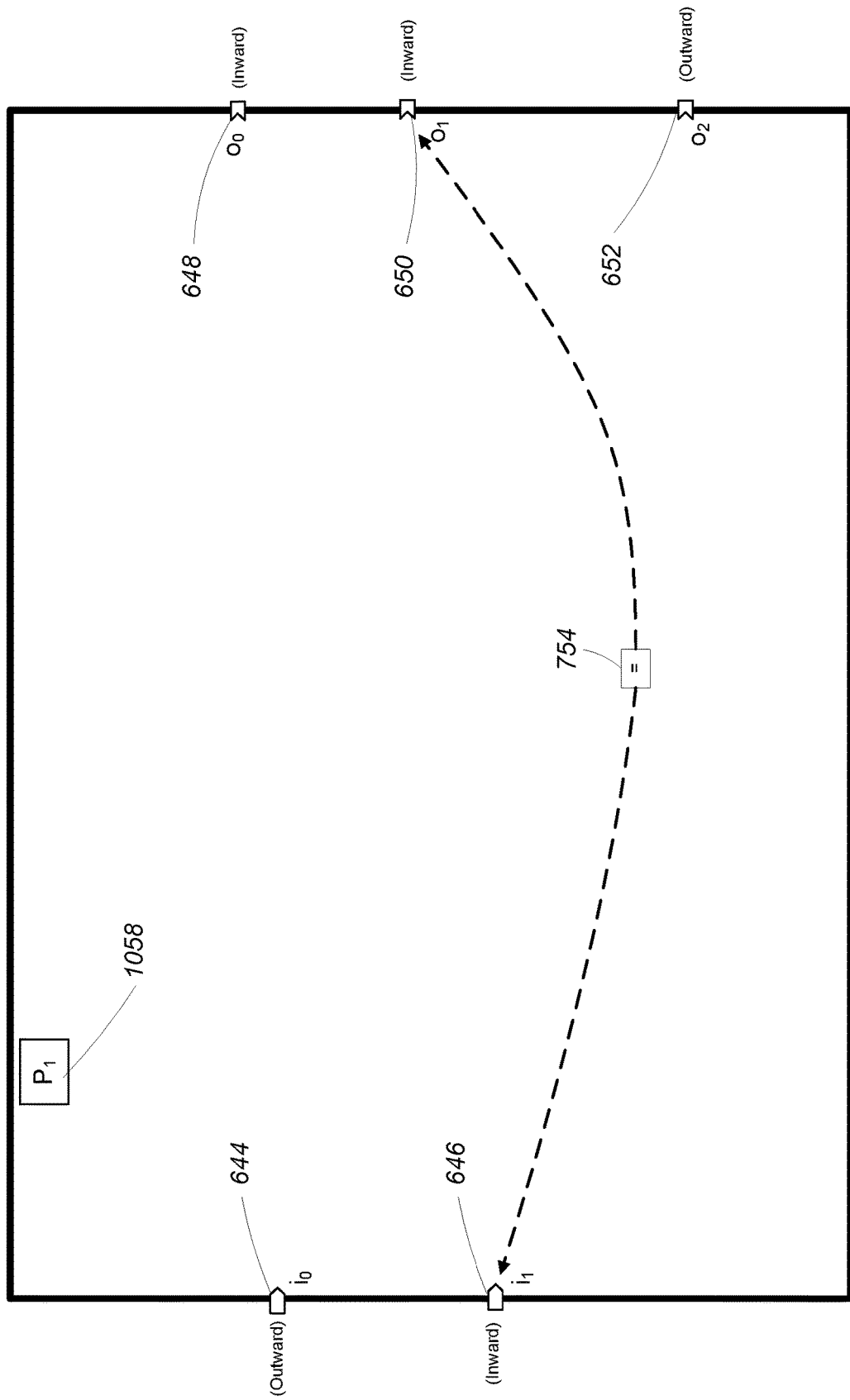
FIG. 11 is the completed initial sub-graph interface.

Referring to FIG. 11, the result of the parameter identification module 138 is the complete initial sub-graph interface 126. The complete initial sub-graph interface 126 is passed out of the automatic dynamic sub-graph generator 122.

It is noted that, in some examples, the various steps of the automatic dynamic sub-graph generator 122 are performed in an order other than the exemplary order described above.

2.2 Sub-Graph Interface Refinement

Referring again to FIG. 4, the initial sub-graph interface 126 output by the automatic sub-graph generator 122 is provided to the sub-graph interface refinement module 128 which allows for a user (or an automated refinement process) to modify the initial sub-graph interface 128 to generate a final sub-graph interface 130.

In some examples, the sub-graph interface refinement module 128 is implemented as a "wizard" that includes a number of screens that facilitate user refinement of the initial sub-graph interface 126.

Figure 12:
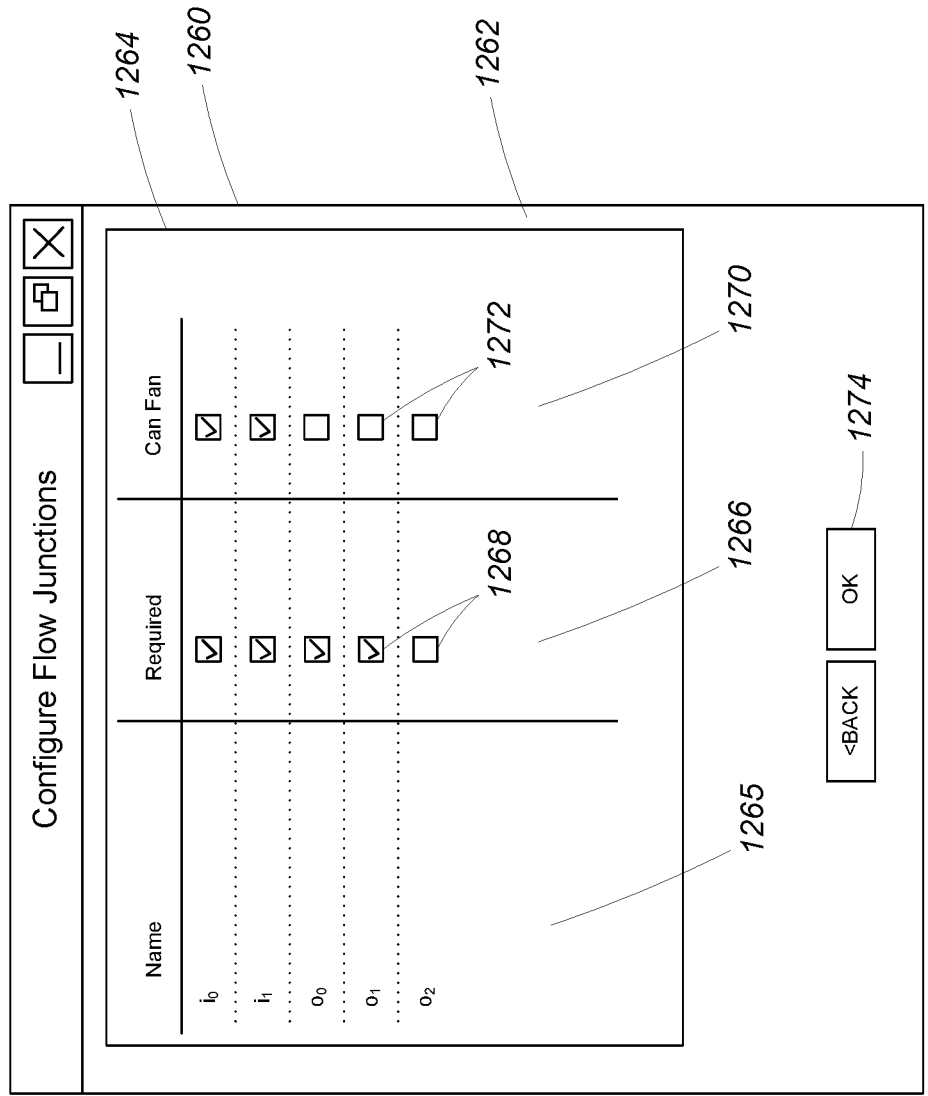
FIG. 12 is a flow junction configuration screen of a sub-graph interface refinement wizard.

Referring to FIG. 12, a first screen 1262 of the wizard 1260 includes a table 1264 for configuring the flow junctions of the initial sub-graph interface 126 that were automatically discovered by the automatic sub-graph generator 122. The table includes a first column 1265 including a list of names of the discovered flow junctions, a second column 1266 including check boxes 1268 for indicating whether each of the flow junctions is "required" on the final sub-graph interface 103, and a third column 1270 including check boxes 1272 for indicating whether each of the flow junctions "can fan."

Checking a check box corresponding to a given flow junction in the second column 1266 indicates that that the given flow junction is a "required" flow junction on the final graph interface 130. Unchecking a check box corresponding to a given flow junction indicates that the given flow junction is not required, or "optional," on the final graph interface 130. Very generally, a flow junction on a sub-graph interface that is "required" must be connected to a flow in a container graph before the container graph can be compiled and executed. A flow junction on a sub-graph interface that is "optional" may or may not be connected to a flow in a container graph and the container graph will compile and execute regardless of whether the optional flow junction is connected to a flow in the container graph.

Checking a check box corresponding to a given flow junction in the third column 1270 indicates that the given flow junction is allowed to "fan-in" if the flow junction is associated with an input port in the implementation sub-graph or "fan-out" if the flow junction is associated with an output port in the implementation sub-graph. Unchecking the checkbox corresponding to a given flow junction in the third column 1270 indicates that the given flow junction is not allowed to "fan-in" or "fan-out."

In the example of FIG. 12, the user has configured the flow junctions by indicating that the first flow junction, $i_0$ 644 is required and can fan-in, indicating that the second flow junction, $i_1$ 646 is required and can fan-in, indicating that the third flow junction, $o_0$ 648 is required and can not fan-out, indicating that the fourth flow junction, $o_1$ 650 is required can not fan-out, and indicating that the fifth flow junction, $o_2$ 652 is optional and can not fan-out.

When the user is satisfied with their configuration of the flow junctions, they click the "OK" button 1274 in the wizard 1260, causing the wizard 1260 to advance to a propagation rule configuration screen of the wizard 1260.

Figure 13:
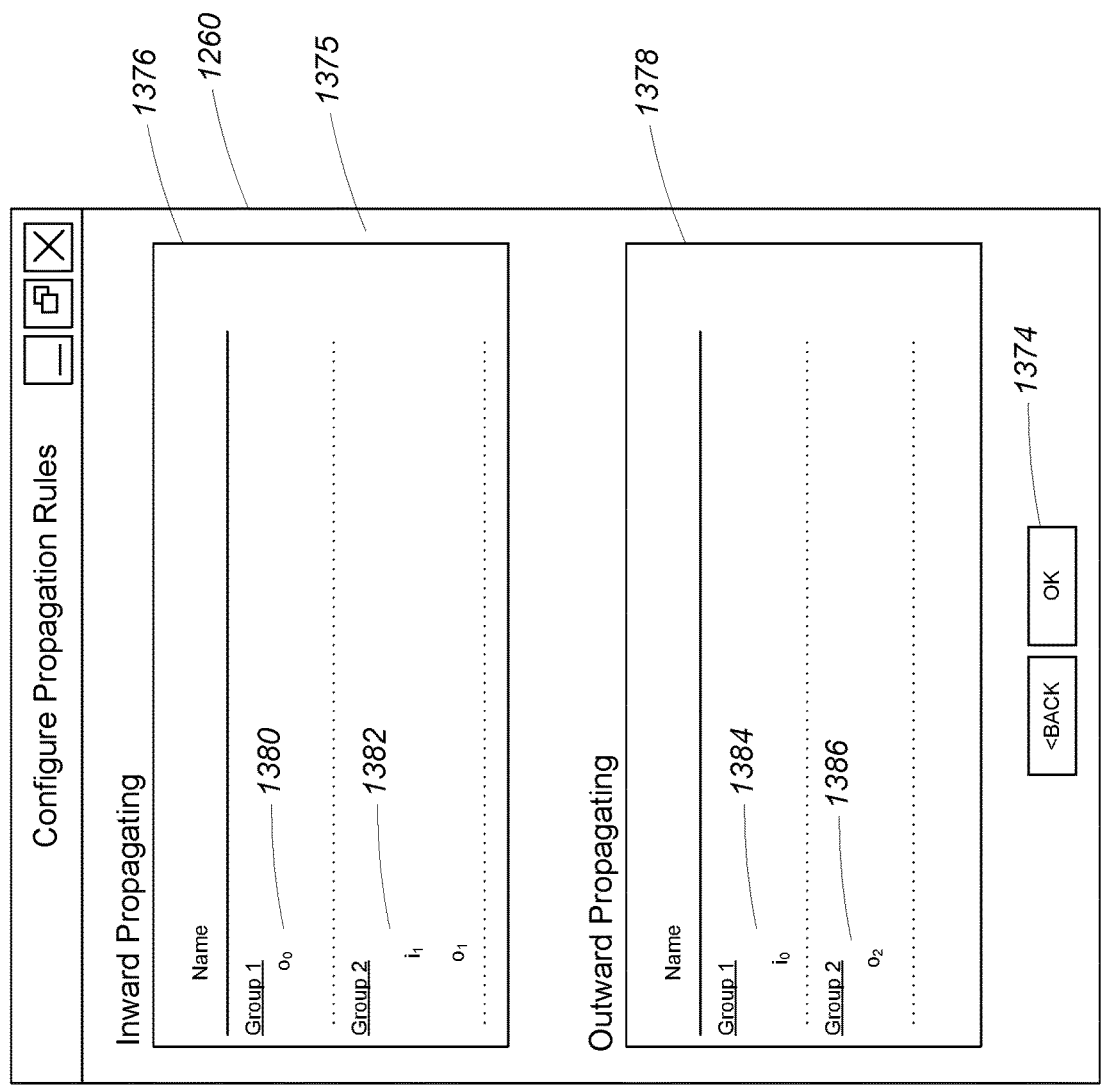
FIG. 13 is a propagation rule configuration screen of the sub-graph interface refinement wizard.

Referring to FIG. 13, the propagation rule configuration screen 1375 includes two tables, a first table 1376 including all of the flow junctions on the initial sub-graph interface 126 that have an inward metadata propagation direction and a second table 1378 including all of the flow junctions on the initial sub-graph interface 126 that have an outward metadata propagation direction. In the first table 1376, flow junctions that are required to have the same metadata (i.e., flow junctions that are part of a "copy" metadata propagation rule) are grouped together.

For example, in FIG. 13, the first table 1376 includes two groups, a first group 1380 including the third flow junction, $o_0$ 648 and a second group 1382 including the second flow junction, $i_1$ 646 and the fourth flow junction, $o_1$ 650. Since the third flow junction, $o_0$ 648 is not part of a "copy" metadata propagation rule, it is the only flow junction in the first group 1380. Since the second flow junction, $i_1$ 646 and the fourth flow junction, $o_1$ 650 are part of a "copy" metadata propagation rule (as is described in the above example), they are both in the same group (i.e., the second group 1382).

The second table 1378 includes two groups, a third group 1384 including the first flow junction, $i_0$ 644 and a fourth group 1386 including the fifth flow junction, $o_2$ 652.

A user of the wizard can use the propagation rule configuration screen 1375 to configure the metadata propagation rules by, for example, merging groups to form "copy" metadata propagation rules or by splitting groups to remove "copy" metadata propagation rules. For example, if a user did not want the "copy" metadata propagation rule specified by the second group 1382 to be included on the final sub-graph interface 130, they would split the second group 1382 into two different groups, one including the second flow junction, $i_1$ 646 and another including the fourth flow junction, $o_1$ 650.

When the user is satisfied with the configuration of the propagation rules for the sub-graph interface, they click the "OK" button 1374 in the wizard 1260, causing the wizard 1260 to advance to a layout configuration screen of the wizard 1260.

Figure 14:
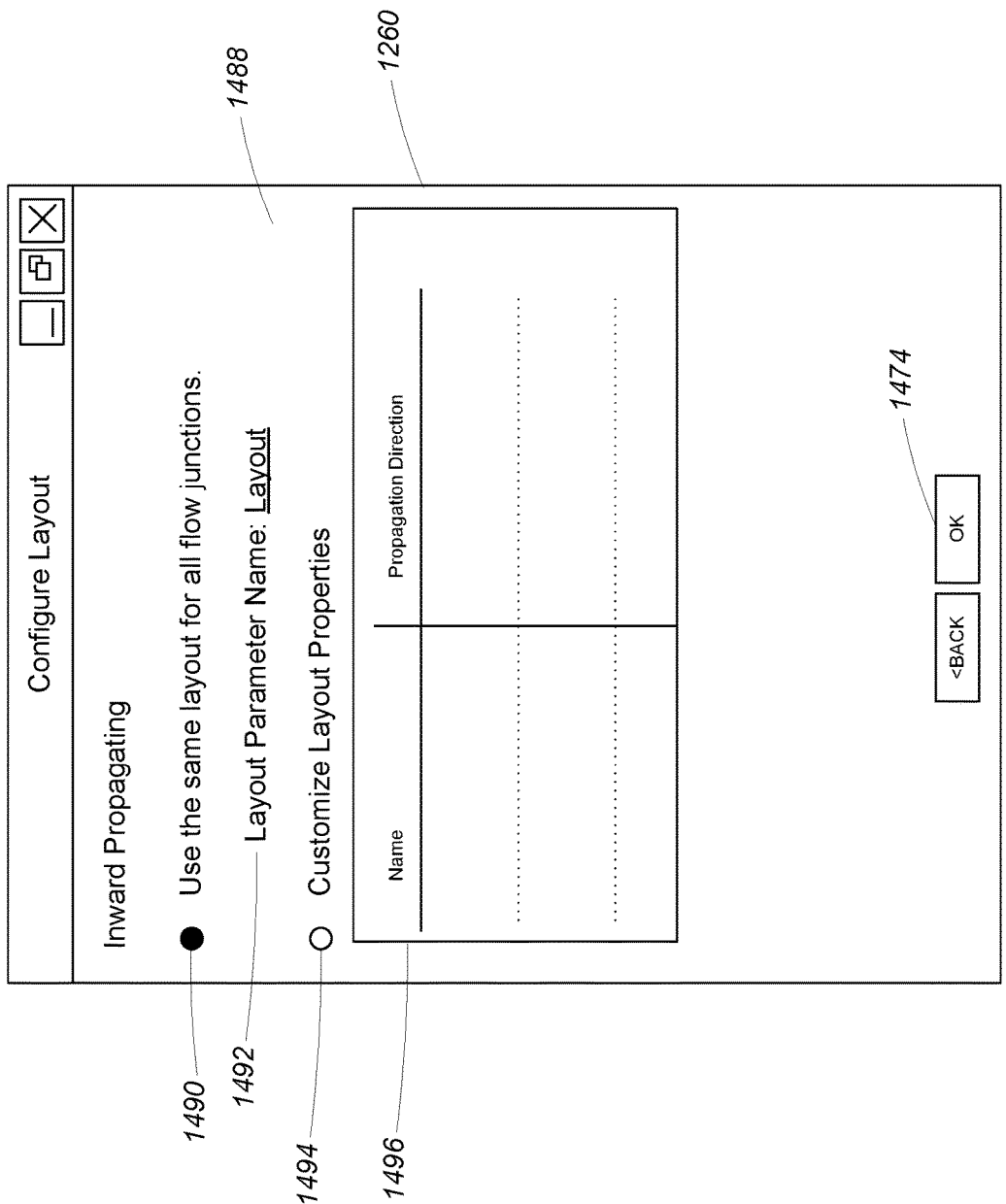
FIG. 14 is a layout configuration screen of the sub-graph interface configuration wizard.

Referring to FIG. 14, the layout configuration screen 1488 includes a radio button with two options. A first option 1490 indicates that all of the flow junctions of the final graph interface 130 should use the same layout metadata, as specified by a layout parameter 1492. A second option 1494 allows a user to specify custom layout properties for the flow junctions of the final graph interface using a table 1496. The table 1496 allows the user to specify a direction of propagation of layout metadata associated with each of the flow junctions and to group flow junctions that have equal layout metadata.

In FIG. 14, the user has selected the first option 1490 indicating that all of the flow junctions have the same layout metadata, as specified by a layout parameter named "Layout."

When the user is satisfied with the configuration of the layout for the sub-graph interface 130, they click the "OK" button 1474 in the wizard 1260, causing the wizard 1260 to advance to a parameter configuration screen of the wizard 1260.

Figure 15:
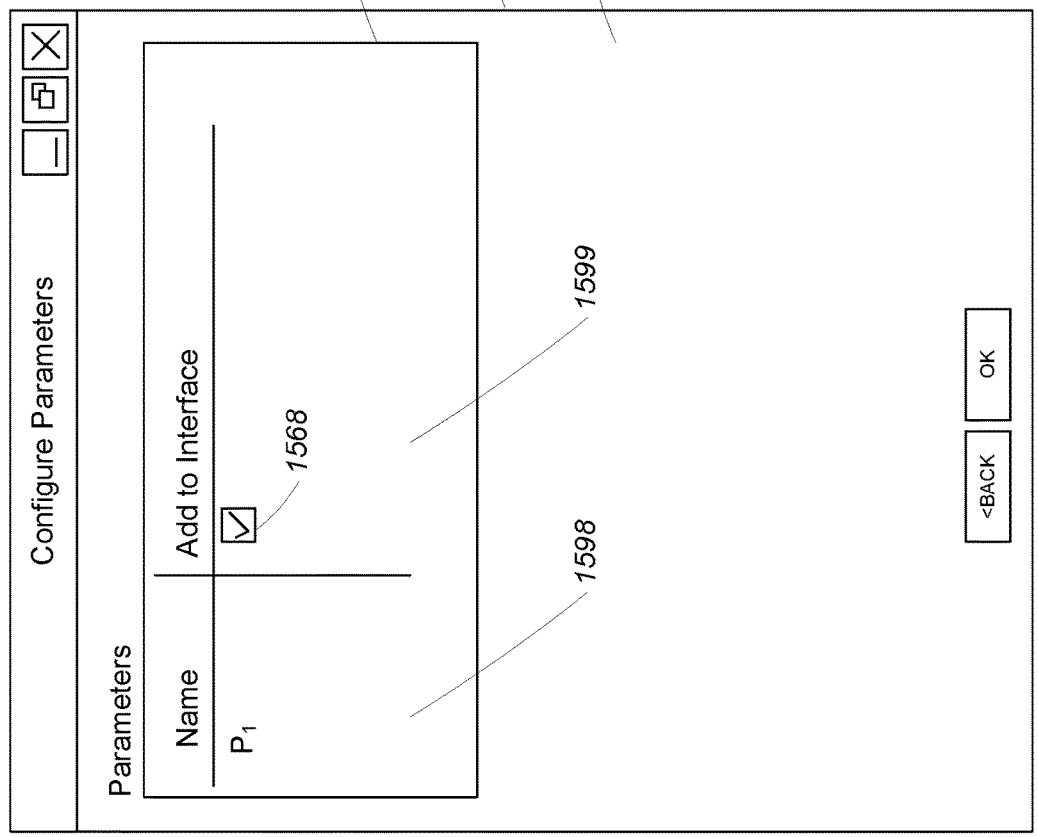
FIG. 15 is a parameter configuration screen the sub-graph interface configuration wizard.

Referring to FIG. 15, the parameter configuration screen 1549 of the wizard 1260 includes a table 1597 for selecting which sub-graph interface parameters associated with the initial sub-graph interface 126 to include on the final sub-graph interface 130. The table 1597 includes a first column 1598 including a list of names of the parameters associated with sub-graph interface parameters on the initial sub-graph interface 126 and a second column 1599 including check boxes 1568 for indicating whether a sub-graph interface parameter for each of the parameters listed in the first column 1598 is included on the final sub-graph interface.

In the example of FIG. 15, only one parameter, $P_1$ is included in the first column 1598 and the check box 1568 associated with $P_1$ is checked, indicating that a sub-graph interface parameter for $P_1$ is included on the final sub-graph interface 130.

When the user is satisfied with the configuration of the sub-graph interface parameters for the sub-graph interface 130, they click the "OK" button 1574 in the wizard 1260, causing the wizard 1260 to complete and output the final sub-graph interface 130.

Figure 16:
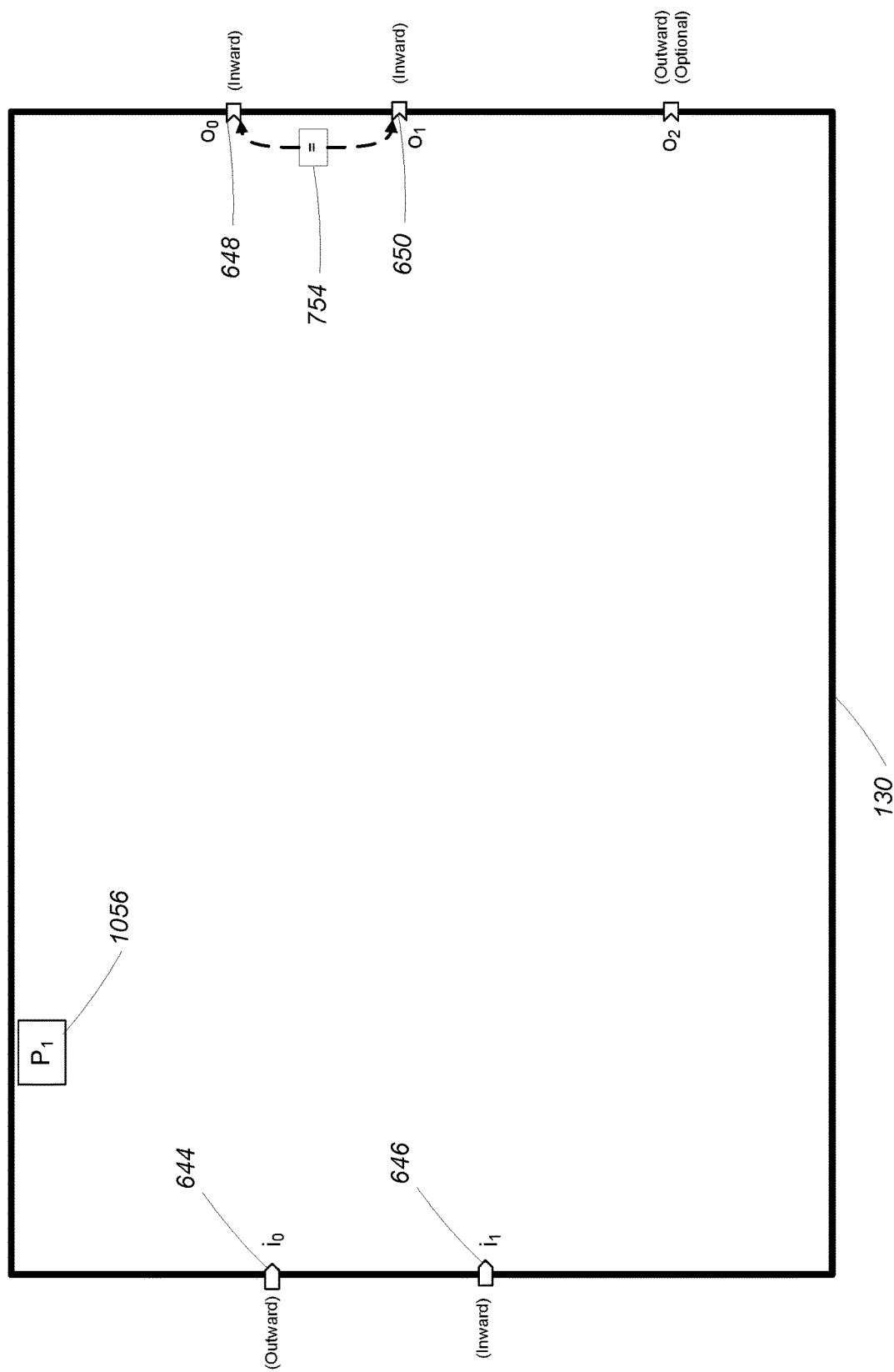
FIG. 16 is the final sub-graph interface.

Referring to FIG. 16, the final sub-graph interface 130 includes the first flow junction, $i_0$ 644 which is required and has an outward direction of metadata propagation, the second flow junction, i1 646 which is required and has an inward direction of metadata propagation, the third flow junction, $o_0$ 648 which is required and has an inward direction of metadata propagation, the fourth flow junction, $o_1$ 650 which is required and has an inward direction of metadata propagation, and the fifth flow junction, $o_2$ 652 which is optional and has an outward direction of metadata propagation. The final sub-graph interface 130 also includes the sub-graph interface parameter 1058, $P_1$ and a "copy" metadata rule 754 between the second flow junction, $i_1$ 646 and the fourth flow junction, $o_1$ 650.

The final sub-graph interface 130 can be used in container graphs in the same manner that the sub-graph interface 210 of FIG. 2A-FIG. 2C is used. Furthermore, depending on the refinements made to the sub-graph interface 130 by the user, the pre-processing module 106 may be capable of dynamically linking and loading a number of different implementation sub-graphs including the automatically generated implementation sub-graph 124, given that they conform to the sub-graph interface 130.

3 Alternatives

In some examples, rather than specifying a sub-graph on disk, a user can select a set of components in a pre-existing dataflow graph for generation of a dynamically linked sub-graph. Upon completion of dynamically linked sub-graph generation, the selected set of components are replaced by the sub-graph interface of the generated dynamically linked sub-graph in the dataflow graph.

4 Implementations

The sub-graph interface generation approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:
receiving a specification including a description of a first directed graph including a first plurality of components interconnected by a first set of one or more directed links;
forming a graph interface for the first plurality of components including,
forming a first flow junction of the graph interface, the first flow junction representing a connection between a flow of data outside the graph interface to or from a port of a component not in the first plurality of components, and a flow of data inside the graph interface to or from a first port of a first component of the first plurality of components, and
configuring one or more properties of the first flow junction such that the first port of the first component is consistent with the one or more properties of the first flow junction;
forming a first implementation of the graph interface including the first plurality of components, the forming including forming a first correspondence between the first flow junction and the first port of the first component of the first plurality of components; and
storing, separately from the specification, both the graph interface and the first implementation of the graph interface in a data storage system.

2. The method of claim 1 further including storing, in the data storage system, a specification including a description of a second directed graph including a second plurality of components interconnected by a second set of one or more directed links, identifying an instance of the first plurality of components interconnected by the first set of one or more directed links of the first directed graph in the second directed graph, and replacing the identified instance of the first plurality of components interconnected by the first set of one or more directed links in the second directed graph with the graph interface.

3. The method of claim 1 wherein configuring the one or more properties of the first flow junction includes determining one or more descriptors of data or computational characteristics associated with the first port of the first component and configuring the one or more properties of the first flow junction based on the determined one or more descriptors.

4. The method of claim 1 wherein configuring the one or more properties of the first flow junction based on the determined one or more descriptors includes determining a direction of propagation of one or more descriptors of data or computational characteristics associated with the first port of the first component and configuring the one or more properties of the first flow junction based on the determined direction of propagation.

5. The method of claim 4 wherein determining a direction of propagation of one or more descriptors of data or computational characteristics associated with the first port of the first component includes identifying the first port as a port that propagates descriptors of data or computational characteristics to the first flow junction and assigning an outward direction of propagation to the first flow junction based on the identification.

6. The method of claim 4 wherein determining a direction of propagation of one or more descriptors of data or computational characteristics associated with the first port of the first component includes identifying the first port as a port that does not propagate descriptors of data or computational characteristics to the first flow junction and assigning an inward direction of propagation to the first flow junction based on the identification.

7. The method of claim 6 wherein forming the graph interface includes:
   forming a second flow junction of the graph interface, the second flow junction representing a connection between a flow of data outside the graph interface to or from a port of a component not in the first plurality of components, and a flow of data inside the graph interface to or from a second port of a second component of the first plurality of components;
   determining a direction of propagation of one or more descriptors of data or computational characteristics associated with the second port of the second component including identifying the second port as a port that does not propagate descriptors of data or computational characteristics to the second flow junction and assigning an inward direction of propagation to the second flow junction based on the identification; and
   identifying a relationship between the one or more descriptors of data or computational characteristics associated with the first port of the first component and the one or more descriptors of data or computational characteristics associated with the second port of the second component and forming a representation of the identified relationship between the first flow junction and the second flow junction.

8. The method of claim 7 wherein the representation of the relationship includes a constraint indicating that one or more descriptors of data or computational characteristics associated with the first flow junction are the same as one or more descriptors of data or computational characteristics associated with the second flow junction.

9. The method of claim 1 further including modifying the one or more properties of the first flow junction such that ports of one or more other components conform to the one or more properties of the first flow junction.

10. The method of claim 9 wherein modifying the one or more properties of the first flow junction includes receiving user input and modifying the one or more properties of the first flow junction based on the user input.

11. The method of claim 9 wherein modifying the one or more properties of the first flow junction includes analyzing the one or more other components to determine one or more descriptors of data or computational characteristics associated with the ports of the one or more other components and modifying the one or more properties of the first flow junction based on the determined one or more descriptors of data or computational characteristics associated with the ports of the one or more other components.

12. The method of claim 9 wherein modifying the one or more properties of the first flow junction includes analyzing the one or more other components to determine a direction of propagation of one or more descriptors of data or computational characteristics associated with the ports of the one or more other components and modifying the one or more properties of the first flow junction based on the determined direction of propagation.

13. The method of claim 1 wherein forming the graph interface further includes identifying a parameter associated with the first plurality of components and adding an flow junction associated with the parameter to the graph interface.

14. The method of claim 13 further including identifying a parameter value corresponding to the parameter and configuring the graph interface to use the identified parameter value as a default value.

15. The method of claim 2 further including preparing the second directed graph for execution including:
   reading the first implementation of the graph interface from the data storage system, and
   inserting the first implementation into the second directed graph including establishing a directed link between the first port of the first component of the first plurality of components in the first implementation of the graph interface and the first flow junction of the graph interface based on the first correspondence between the first flow junction and the first port of the first component of the first plurality of components in the first implementation of the graph interface.

16. The method of claim 2 further including preparing the second directed graph for execution including:
   reading a second implementation of the graph interface, different from the first implementation of the graph interface, from the data storage system, and
   inserting the second implementation into the second directed graph including establishing a directed link between a port of a component in the second implementation of the graph interface and the first flow junction of the graph interface based on a second correspondence between the first flow junction and the port of the component in the second implementation of the graph interface.

17. The method of claim 1 wherein the first flow junction includes a flow junction for joining a directed link connected to the first port of the first component of the first plurality of components to a port of another component not included in the first plurality of components.

18. Software stored in a non-transitory form on a computer-readable medium, the software including instructions for causing a computing system to:
   receive a specification including a description of a first directed graph including a first plurality of components interconnected by a first set of one or more directed links;
   form a graph interface for the first plurality of components including,
     forming a first flow junction of the graph interface, the first flow junction representing a connection between a flow of data outside the graph interface to or from a port of a component not in the first plurality of components, and a flow of data inside the graph interface to or from a first port of a first component of the first plurality of components, and
     configuring one or more properties of the first flow junction such that the first port of the first component is consistent with the one or more properties of the first flow junction;
   form a first implementation of the graph interface including the first plurality of components, the forming including forming a first correspondence between the first flow junction and the first port of the first component of the first plurality of components; and
   store, separately from the specification, both the graph interface and the first implementation of the graph interface in the data storage system.

19. A computing system including:
   an input device configured to receive a specification including a description of a first directed graph including a first plurality of components interconnected by a first set of one or more directed links;
at least one processor configured to process the specification, the processing including
forming a graph interface for the first plurality of components including,
forming a first flow junction of the graph interface, the first flow junction representing a connection between a flow of data outside the graph interface to or from a port of a component not in the first plurality of components, and a flow of data inside the graph interface to or from a first port of a first component of the first plurality of components, and
configuring one or more properties of the first flow junction such that the first port of the first component is consistent with the one or more properties of the first flow junction;
forming a first implementation of the graph interface including the first plurality of components, the forming including forming a first correspondence between the first flow junction and the first port of the first component of the first plurality of components; and
storing, separately from the specification, both the graph interface and the first implementation of the graph interface in the data storage system.

20. A computing system including:
means for receiving a specification including a description of a first directed graph including a first plurality of components interconnected by a first set of one or more directed links; and
means for processing the specification, the processing including
forming a graph interface for the first plurality of components including,
forming a first flow junction of the graph interface, the first flow junction representing a connection between a flow of data outside the graph interface to or from a port of a component not in the first plurality of components, and a flow of data inside the graph interface to or from a first port of a first component of the first plurality of components, and
configuring one or more properties of the first flow junction such that the first port of the first component is consistent with the one or more properties of the first flow junction;
forming a first implementation of the graph interface including the first plurality of components, the forming including forming a first correspondence between the first flow junction and the first port of the first component of the first plurality of components; and
storing, separately from the specification, both the graph interface and the first implementation of the graph interface in the data storage system.

21. A method for determining a graph interface, the method including:
receiving a specification including a description of a first directed graph including a plurality of components interconnected by directed links;
forming a graph interface for the first directed graph including:
analyzing the first directed graph to identify information for forming one or more flow junctions of the graph interface, each of at least some flow junctions of the one or more flow junctions representing a connection between a flow of data outside the graph interface to or from a port of a component not in the first plurality of components, and a flow of data inside the graph interface and being associated with one or more properties including at least one of a metadata descriptor property or a direction of metadata propagation property; and
for each of at least some flow junctions of the one or more flow junctions, analyzing the first directed graph to determine whether a value of the metadata descriptor property associated with the flow junction is propagated to the flow junction from the first directed graph or is propagated to the flow junction from a second directed graph that is a container graph in which the graph interface is utilized, and configuring the direction of metadata propagation property for the flow junction based on a result of the analysis; and
storing, separately from the specification, the graph interface in the data storage system.

22. The method of claim 21 wherein the metadata descriptor property associated with the flow junction includes a data characteristic of data transferred via the flow junction or a computational characteristic of one or more of the plurality of components.

23. The method of claim 22 wherein the data characteristic includes a format of fields of records within the transferred data.

24. The method of claim 22 wherein the computational characteristic includes a degree of parallelism of execution of a computation represented by one or more of the plurality of components.

25. The method of claim 21 wherein forming a graph interface for the first directed graph further includes, for each of at least some flow junctions of the one or more flow junctions, analyzing the first directed graph to determine that the one or more properties associated with the flow junction specify that the flow junction is configured to transfer a parameter value through the graph interface.

26. The method of claim 21 wherein determining whether the value of the metadata descriptor property associated with the flow junction is propagated to the flow junction from the first directed graph or is propagated to the flow junction from the second directed graph includes determining that the value of the metadata descriptor property associated with the flow junction is propagated to the flow junction from the first directed graph based on an identification of a component of the plurality of components that propagates a value of the metadata descriptor property to the flow junction.

27. The method of claim 21 wherein determining whether the value of the metadata descriptor property associated with the flow junction is propagated to the flow junction from the first directed graph or is propagated to the flow junction from the second directed graph includes determining that the value of the metadata descriptor property associated with the flow junction is propagated to the flow junction from the second directed graph based on a determination that no component of the plurality of components propagates a value of the metadata descriptor property to the flow junction.

28. The method of claim 21 wherein forming the graph interface for the first directed graph further includes determining that two or more of the flow junctions are each necessarily associated with a same property.

29. The method of claim 21 further including storing, in a data storage system, a representation of the graph interface and a representation of the first directed graph.

30. The method of claim 21 wherein at least some of the one or more flow junctions include a flow junction for joining a directed link connected to a port of a component of the plurality of components to a port of another component not included in the plurality of components.

31. Software stored in a non-transitory form on a computer-readable medium, for determining a graph interface, the software including instructions for causing a computing system to:
receive a specification including a description of a first directed graph including a plurality of components interconnected by directed links;
form a graph interface for the first directed graph including:
analyzing the first directed graph to identify information for forming one or more flow junctions of the graph interface, each of at least some flow junctions of the one or more flow junctions representing a connection between a flow of data outside the graph interface to or from a port of a component not in the first plurality of components, and a flow of data inside the graph interface and being associated with one or more properties including at least one of a metadata descriptor property or a direction of metadata propagation property; and
for each of at least some flow junctions of the one or more flow junctions, analyzing the first directed graph to determine whether a value of the metadata descriptor property associated with the flow junction is propagated to the flow junction from the first directed graph or is propagated to the flow junction from a second directed graph that is a container graph in which the graph interface is utilized, and configuring the direction of metadata propagation property for the flow junction based on a result of the analysis; and
storing, separately from the specification, the graph interface in the data storage system.

32. A computing system for determining a graph interface, the computing system including:
an input device configured to receive a specification including a description of a first directed graph including a plurality of components interconnected by directed links; and
at least one processor configured to process the specification, the processing including
forming a graph interface for the first directed graph including:
analyzing the first directed graph to identify information for forming one or more flow junctions of the graph interface, each of at least some flow junctions of the one or more flow junctions representing a connection between a flow of data outside the graph interface to or from a port of a component not in the first plurality of components, and a flow of data inside the graph interface and being associated with one or more properties including at least one of a metadata descriptor property or a direction of metadata propagation property;
for each of at least some flow junctions of the one or more flow junctions, analyzing the first directed graph to determine whether a value of the metadata descriptor property associated with the flow junction is propagated to the flow junction from the first directed graph or is propagated to the flow junction from a second directed graph that is a container graph in which the graph interface is utilized, and configuring the direction of metadata propagation property for the flow junction based on a result of the analysis; and
storing, separately from the specification, the graph interface in the data storage system.

33. A computing system for determining a graph interface, the computing system including:
means for receiving a specification including a description of a first directed graph including a plurality of components interconnected by directed links; and
means for processing the specification, the processing including
forming a graph interface for the first directed graph including:
analyzing the first directed graph to identify information for forming one or more flow junctions of the graph interface, each of at least some flow junctions of the one or more flow junctions representing a connection between a flow of data outside the graph interface to or from a port of a component not in the first plurality of components, and a flow of data inside the graph interface and being associated with one or more properties including at least one of a metadata descriptor property or a direction of metadata propagation property; and
for each of at least some flow junctions of the one or more flow junctions, analyzing the first directed graph to determine whether a value of the metadata descriptor property associated with the v is propagated to the flow junction from the first directed graph or is propagated to the flow junction from a second directed graph that is a container graph in which the graph interface is utilized, and configuring the direction of metadata propagation property for the flow junction based on a result of the analysis; and
storing, separately from the specification, the graph interface in the data storage system.

* * * * *